US007218980B1

(12) United States Patent
Orshansky et al.

(10) Patent No.: US 7,218,980 B1
(45) Date of Patent: *May 15, 2007

(54) PREDICTION BASED OPTIMIZATION OF A SEMICONDUCTOR SUPPLY CHAIN USING AN ADAPTIVE REAL TIME WORK-IN-PROGRESS TRACKING SYSTEM

(75) Inventors: Michael E. Orshansky, Oakland, CA (US); Klaus ten Hagen, Sunnyvale, CA (US)

(73) Assignee: eSilicon Corporation, Sunnyvale, CA (US)

( * ) Notice: Subject to any disclaimer, the term of this patent is extended or adjusted under 35 U.S.C. 154(b) by 720 days.

This patent is subject to a terminal disclaimer.

(21) Appl. No.: 09/912,030

(22) Filed: Jul. 23, 2001

(51) Int. Cl.
*G06F 19/00* (2006.01)

(52) U.S. Cl. .................. 700/99; 700/100; 700/121; 700/115; 700/116; 705/28

(58) Field of Classification Search .............. 700/99, 700/100, 95, 97, 90, 216, 121, 115, 116; 705/22
See application file for complete search history.

(56) References Cited

U.S. PATENT DOCUMENTS

| 5,818,716 | A | * | 10/1998 | Chin et al. ............... 700/100 |
| 5,966,694 | A | * | 10/1999 | Rothschild et al. ............ 705/7 |
| 6,049,742 | A | * | 4/2000 | Milne et al. ................... 700/99 |
| 6,366,824 | B1 | * | 4/2002 | Nair et al. ................... 700/115 |
| 6,748,287 | B1 | * | 6/2004 | Hagen et al. .................. 700/99 |
| 6,772,028 | B1 | * | 8/2004 | Yen et al. ....................... 700/99 |
| 7,117,060 | B2 | * | 10/2006 | McPhee et al. ............. 700/110 |
| 2002/0032611 | A1 | * | 3/2002 | Khan ........................... 705/26 |
| 2002/0103709 | A1 | * | 8/2002 | Anthony et al. .............. 705/22 |
| 2002/0188513 | A1 | * | 12/2002 | Gil et al. ....................... 705/22 |
| 2002/0188682 | A1 | * | 12/2002 | Jaln et al. .................... 709/205 |
| 2002/0198757 | A1 | * | 12/2002 | Hegde et al. .................. 705/8 |
| 2006/0200261 | A1 | * | 9/2006 | Monette et al. ............. 700/108 |

* cited by examiner

*Primary Examiner*—Lynda C Jasmin
(74) *Attorney, Agent, or Firm*—Fenwick & West LLP

(57) ABSTRACT

A work-in-progress (WIP) tracking system is used to coordinate a semiconductor supply chain operation. The WIP tracking system receives WIP updates from semiconductor supply chain vendors and generates a WIP tracking report in which the volume of WIP is measured in expected good parts. In one variation, rather than reporting the WIP currently located at each step of a vendor's process, the WIP tracking report reflects the WIP located at various stages of the semiconductor manufacturing process, where the vendor's steps are mapped to a fewer number of stages.

67 Claims, 19 Drawing Sheets

| Phase | Vendor | Estimated Time (Days) |
|---|---|---|
| Order Processing | ASIC Provider | 3 |
| GDSII Preparation | ASIC Provider | 19 |
| Fabrication | Fab | 61 |
| Probe Card Making | Test/Assembly House | 56 |
| Package Design | Test/Assembly House | 56 |
| Wafer Transfer | Freight Forwarder | 1 |
| Packaging | Test/Assembly House | 3 |
| Parts Transfer | Freight Forwarder | 1 |
| Test & Debug | ASIC Provider | 5 |
| Parts Transfer | Freight Forwarder | 1 |
| TOTAL | | 94 |

FIG. 2A

| Phase | Vendor | Estimated Time(Days) |
|---|---|---|
| Order Processing | Fabless ASIC Provider | 5 |
| Fabrication | Foundry | 68 |
| Wafer Transfer | Freight Forwarder | 1 |
| Package/Test | Test/Assembly House | 15 |
| Parts Transfer | Freight Forwarder | 1 |
| TOTAL | | 90 |

FIG. 2B

| Step No. | Step Name | Step Group |
|---|---|---|
| 1 | WAF-1 | Wafer Start |
| 9 | TRCH1-CMP | Wafer Start |
| 11 | SAC1-OX | Wafer Start |
| 25 | PO1-DP | Gate Mask |
| 27 | PO1-ET | Gate Mask |
| 63 | ME1-PH | Metal 1 |
| 64 | ME1-ET | Metal 1 |
| 76 | VA2-CMP | Metal 3 |
| 76 | VA2-CMP | Metal 3 |
| 117 | PA1-PH | Metal 6 |
| 120 | WAT 2-1 | WAT |
| 121 | SORT | SORT |

FIG. 2C

|  | Customer Order 1 | Customer Order 2 |
|---|---|---|
| Time Stamp | 12:20 am, 06/20/01 | 12:20 am, 06/20/01 |
| Foundry ID | 5910 | 5920 |
| Lot ID | 5910-1 | 5920-2 |
| Current Step | WAF1-START | WAF1-START |
| Current Quantity | 25 | 25 |
| ... | ... | ... |

FIG. 2D

PRODUCT GRAPH 600

LOT GRAPH 1

Node 10

| Start Date | Original | Actual | intRevised |
|---|---|---|---|
| Start Date | 12/31 | --- | 12/31 |
| Duration | 1 | --- | 1 |
| QTY | --- | --- | --- |

Node 11

| | Original | Actual | intRevised |
|---|---|---|---|
| Start Date | 1/1 | --- | 1/1 |
| Duration | 1 | --- | 1 |
| QTY | --- | --- | --- |

Process Flow 709 for Lot ID 702

| Step | Expected Duration | Conversion Factor |
|---|---|---|
| 10 | 1 | 200 |
| 11 | 1 | 200 |

FIG. 7A

PREDICTION BASED OPTIMIZATION OF A SEMICONDUCTOR SUPPLY CHAIN USING AN ADAPTIVE REAL TIME WORK-IN-PROGRESS TRACKING SYSTEM

CROSS-REFERENCE TO RELATED APPLICATION

This application relates to U.S. Pat. No. 6,748,287, "An Adaptive Real-time Work-in-progress Tracking, Prediction, and Optimization System for a Semiconductor Supply Chain," by Klaus ten Hagen and Michael E. Orshansky, filed on Jul. 23, 2001, which subject matter is incorporated herein by reference.

BACKGROUND OF THE INVENTION

1. Field of the Invention

This invention relates generally to efficient operation of a semiconductor supply chain, and more particularly, to providing a work-in-progress (WIP) tracking system and generating a variety of meaningful WIP tracking reports to customers.

2. Description of the Related Art

A typical semiconductor manufacturing process includes multiple phases. For example, a wafer foundry (or fab) begins with raw silicon wafers and fabricates integrated circuits on these wafers. A test vendor may test the integrated circuits and mark the good die on the wafer. An assembly/packaging vendor may dice the wafer into separate die and assemble the good die into various packages with appropriate electrical connections. A final test vendor may perform final testing of the finished packaged part to make sure that the chips are operating according to specification. A shipping vendor may transport the WIP between the different supply chain vendors and finally distribute the finished good parts to their intended destination. Thus, the semiconductor supply chain may include many separate entities, all of which shall be referred to as vendors.

As the semiconductor manufacturing process becomes more complex, companies in this industry are specializing. As a result, customers, such as fabless semiconductor companies and integrated device manufacturers, are using an increasing number of semiconductor supply chain vendors for prototype development or mass production of integrated circuits. In other words, generally speaking, the semiconductor supply chain contains an increasing number of vendors. Thus, it would be beneficial for customers to obtain concise, meaningful reports as to the status of WIP within their supply chains.

However, one characteristic of the semiconductor industry is that vendors in a semiconductor supply chain are often located in different time zones, in different countries, or speak different languages, making person-to-person communications difficult. In addition, manufacturing data and other information provided by the vendors may be in incompatible formats or have other deficiencies such as providing unreliable prediction of product quantity or shipment date. The resulting difficulty in effective communication and information sharing throughout the supply chain can cause significant barriers to generating consistently meaningful WIP tracking reports.

To aid the customer to keep track of the IC manufacturing process on the supply chain, some supply chain vendors send work-in-progress (WIP) updates to customers. For example, typical WIP updates from a foundry vendor contain raw manufacturing data and information pertinent to an order made by the customer. The manufacturing data and information typically are reported on a per-unit basis. For example, if an order is subdivided into lots, the WIP update may specify the number of wafers in each lot, where the lots are in the manufacturing process, the start time for each lot, etc. WIP updates generally are produced regularly (e.g., three times a day) for every lot in production, at every stage of production. The resulting volume of data in the WIP updates is immense.

However, the WIP updates, although they contain an immense amount of very detailed information, are usually meaningless for customers. They fail to give a customer a clear summary of what is most important to him. For example, one important business concern for customers outsourcing IC manufacturing is the on-time completion and delivery of IC products at each phase of the supply chain. An update which summarizes how many packaged and tested IC products can be expected to be delivered on the originally scheduled date would be useful. However, WIP updates generally fail to give this type of information. Instead, the typical WIP update details exactly where each unit of product is in the manufacturing process. The customer would have to perform a sophisticated statistical analysis to convert this raw WIP information to an estimate of on-time expected good parts. As another example, it is also of interest to customers to monitor the progress of IC orders as the WIP moves between supply chain vendors. If delays occur at some stages to some vendors so that the ordered IC products will not be available on time, the customers may choose to subcontract with additional supply chain vendors to reach production goals. Again, typical WIP updates do not directly supply this type of information.

Therefore, what is needed is a system and method to analyze raw WIP data and provide a meaningful and appropriate presentation of WIP analysis results to a customer. For example, converting raw WIP data into the expected good parts currently at each major semiconductor manufacturing stage of the supply chain would be beneficial.

SUMMARY OF INVENTION

The present invention overcomes limitations and disadvantages of current semiconductor supply chain management methods by providing a work-in-progress (WIP) tracking system to generate work-in-progress (WIP) tracking reports for reflecting a semiconductor supply chain status from different perspectives.

In one embodiment, the WIP tracking report is a customer delivery schedule reflecting past, present and/or future delivery schedule of expected good parts to a customer, or from one vendor to another vendor. In one implementation, the estimates of future delivery in the customer delivery schedule are based on tracking the entire supply chain, and advanced analysis algorithms and statistical modeling of completion time and yield are used to provide estimates of future delivery.

In another embodiment, the WIP tracking report shows the volume of WIP at various locations throughout the semiconductor supply chain. The volume of WIP is measured in expected good parts, for example either the number of good parts expected at the end of the supply chain or the number expected to be delivered by or to a vendor in the supply chain. These reports can serve as a vehicle for discussing options for managing the supply chain, for example in response to changing needs.

Another WIP tracking report states the status of an order, for example as backlogged, in process as WIP, or delivered.

The volumes are reported in expected good parts so that WIP is converted from actual WIP to expected good parts.

In another implementation, the WIP tracking report is a report on various vendors' performance, for example their rate of on-time delivery. These can be used to help customers assess the capabilities of various vendors and to help troubleshoot the supply chain if, for example, a vendor's performance begins to deviate significantly from historical norms.

In one implementation, the WIP tracking reports are generated by a WIP tracking system. The WIP tracking system receives manufacturing data and information from supply chain vendors (WIP updates) indicating the status of WIP at different steps within the vendor's process. The WIP tracking system updates a data representation of the supply chain to reflect the WIP updates. In one approach, the vendor's steps are mapped to a fewer number of stages and the WIP tracking report reflects the volume of WIP at each of the stages, rather than at each individual step of the vendor. In another variation, there are multiple vendors, each with its own processes and steps. The steps from all vendors are mapped to a common set of stages.

To improve the reliability and accuracy of the WIP tracking reports, one embodiment of the WIP tracking system performs consistency checking of WIP updates to detect and prevent missing or misleading WIP updates, thus increasing the accuracy of the data representation and also the WIP tracking reports, for example the prediction of expected good parts. In another embodiment, the WIP tracking system uses statistical methods to derive reliable prediction and estimation of product arrival time and quantity to improve the reliability of the WIP tracking reports.

The WIP tracking system also has an alert engine that detects significant deviations from the last revised plan in schedule and/or quantity and by that increases customers' confidence in the accuracy of the WIP tracking reports. If an alert is generated, the data representation is revised in order to derive a more reliable estimation of WIP and final product arrival time and quantity.

In another embodiment, the WIP tracking system reduces or even minimizes the amount of negative news reported in the WIP tracking reports. This in turn minimizes the need for schedule revisions by the customer.

The generation of WIP tracking reports result in numerous benefits. WIP tracking reports substantially improve the customer's visibility of the semiconductor supply chain, for example by giving customers clear and distinct messages on expected good parts and delivery schedule and other supply chain related information. This, in turn, allows the customer to better utilize its supply chain.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 2A illustrates an overview of a prototype/NRE workflow in a semiconductor supply chain;

FIG. 2B illustrates an overview of a mass production workflow in a semiconductor supply chain;

FIG. 2C illustrates an example of the process flow data provided by a foundry within a prototype/NRE workflow;

FIG. 2D illustrates an example of the WIP updates from a foundry;

FIG. 7A illustrates an initialization process of a graph-based WIP tracking system;

DESCRIPTION OF THE PREFERRED EMBODIMENTS

The semiconductor industry is nowadays under escalating pressure to reduce the cycle time from the integrated circuit (IC) chip design phase to the volume production phase. One approach is to use efficient methods to coordinate supply chain operations. However, such efforts are impeded by various practical obstacles such as complexity in business-to-business integration and concerns for business confidentiality. The present invention is provided to coordinate operations of a semiconductor supply chain with multiple vendors, while adequately addressing these practical barriers. The present invention reduces timing and quantity uncertainty in the supply chain, thus reducing overall cycle time, by generating and disseminating targeted work-in-progress (WIP) reports and/or advance notices, which reduce voluminous manufacturing data and information into a form which caters to the needs of supply chain vendors and customers. It also maintains business confidentiality for supply chain vendors and benefits them for their participation in information sharing and exchange.

Figure 1:
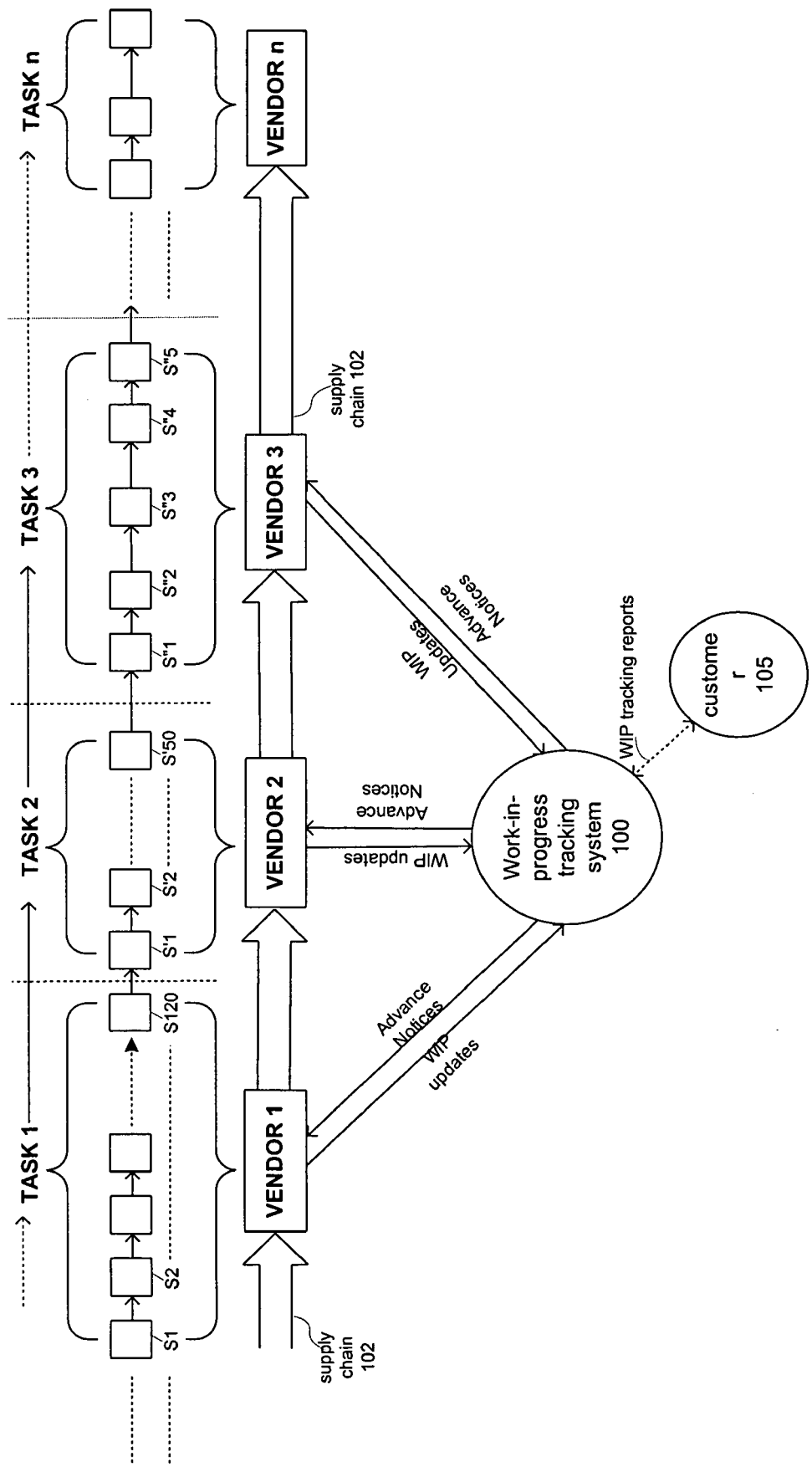
FIG. 1 is a schematic diagram illustrating a semiconductor supply chain and a semiconductor work-in-progress (WIP) tracking system.

FIG. 1 schematically illustrates an embodiment of operation of a semiconductor supply chain 102. The semiconductor supply chain 102 involves a plurality of semiconductor manufacturers and service providers, which are referred to as vendor 1, vendor 2, . . . and vendor n. Examples of vendors include wafer suppliers, wafer foundry, test vendors, providers of test boards, assembly/packaging vendors, and freight forwarders.

The example supply chain 102 in FIG. 1 is shown as a linear chain in which each vendor supplies to a next vendor in the chain. However, the invention applies equally to other types of supply chains, including those with splits (e.g., one vendor supplies to multiple next vendors) and those with joins (e.g., one vendor is supplied by multiple vendors). As an example of the former, a wafer foundry might supply processed wafers to multiple test vendors. As an example of the latter, the final test vendor may require supply from both the packaging vendor and a provider of testing boards before it can complete the final tests.

A customer 105 desires to have a semiconductor product (i.e., an IC chip) manufactured. In a common example, the customer 105 is a design house which has designed an IC chip and now desires to have it manufactured, either for subsequent sale to the general market or for internal use. The end product of the supply chain 102 is this IC chip.

In one scenario, the customer 105 contracts directly with each of the vendors in the semiconductor supply chain 102 to perform the tasks necessary to manufacture the IC product. In this case the customer will be running the WIP tracking system 100 itself. In an alternate scenario, the customer 105 orders the IC product from a fabless semiconductor provider or fabless ASIC provider, such as eSilicon Corporation of Santa Clara, Calif. The fabless semiconductor provider then coordinates the supply chain 102 on behalf of the customer 105. In FIG. 1, the fabless semiconductor provider does so via the WIP tracking system 100. One advantage of using a fabless semiconductor provider is that the provider typically has the capability to integrate a multitude of resources for semiconductor development, from design specification through manufacturing and delivery of packaged and tested parts for a customer company. In addition, the fabless semiconductor provider can typically use its experience to deliver packaged and tested integrated circuits at significant predictability and shortened cycle time.

Referring again to FIG. 1, the term task is used to refer to the entire process performed by one vendor before handing off to the next vendor. The tasks 1, 2, . . . n may be manufacturing, service or other tasks. The arrows in FIG. 1 between the tasks indicate dependencies in the semiconductor manufacturing process. Thus, task 2 performed by vendor 2 is dependent upon completion of task 1 performed by vendor 1. Accordingly, vendor 2 may be referred to as being downstream of vendor 1 or as a downstream vendor to vendor 1. Conversely, vendor 1 is upstream to vendor 2. In the same way, vendor 2 is upstream to vendors 3-n. Note that the same entity may play the roles of multiple vendors. For example, if company X performed tasks 1 and 3, but company Y performed the intervening task 2, then vendors 1 and 3 would both be company X.

Each task performed by the supply chain vendors may be a combination of multiple steps. For example, the task 1 contains steps s1, s2, . . . s120; the task 2 contains steps s'1, s'2, . . . s'50; the task 3 contains steps s"1, s"2, . . . s"5. As further described below, for some tasks performed by the supply chain vendors, the steps may be categorized into groups (not shown in FIG. 1) according to semiconductor industry practices.

FIGS. 2A and 2B show two different workflows which may be implemented by a semiconductor supply chain 102: a prototype/NRE(non recurring engineering) workflow and a production workflow. As shown in FIG. 2A, a typical prototype/NRE workflow, focusing on delivering a tested and manufactured prototype chip, involves many phases. Some of the phases shown include GDSII preparation by the ASIC provider, fabrication at a foundry, probe card making and package design at test/assembly house, wafer transfer by freight forwarder, packaging by test/assembly house, test and debug by the wafer foundry, parts transfer by a freight forwarder to customer, etc. Some of the phases may occur concurrently. These phases may be divided among vendors in any number of ways. For example, a single vendor may carry out multiple phases of the workflow, a single phase may be carried out by multiple vendors, or there may be a one-to-one correspondence between vendors and phases. Thus it is typical in a prototype/NRE workflow that there are a large number of interactions between the supply chain vendors and the customer is often strongly interested in getting a functioning prototype in a shortest time. Therefore, it is especially valuable to provide a mechanism to reduce any unpredictability and lack of coordination between vendors in the supply chain in the case of the prototype/NRE workflow.

FIG. 2B illustrates an overview of a typical production workflow. The production workflow is usually more streamlined than the corresponding prototype/NRE workflow. The major phases involve fabrication at foundry, wafer transfer by freight forwarder, package and testing by test/assembly house, and parts transfer by freight forwarders to customer. In reality, the production workflow may be complicated. For example, the assembly task may be performed by different supply chain vendors, and thus processed wafers must be routed to different locations. In general, the production workflow is driven to meet production goals of the customer in an economical manner. It is thus critical that participating supply chain vendors are well managed to schedule manufacturing capacity for upcoming tasks to lessen the cycle time.

As explained above, each task performed by a vendor typically includes many steps. For example, a foundry vendor may perform the task of generating masks and manufacturing prototype wafers. Referring to FIG. 2C, this single task is granulated into a series of steps: WAF1-START(step 1), . . . TRCH1-CMP(step 9), SAC1-OX(step 11), . . . PO1-DP(step 25), . . . ME1-ET (step 64), . . . WAT 2-1 (step 120), SORT (step 121), etc. These steps define a process flow for a vendor. Note that not all steps are shown for the process flow described in FIG. 2C. FIG. 2C further shows that these steps can be combined into step groups according to semiconductor industry practices. FIG. 2C shows steps 1, 9 and 11 belong to the group "wafer start"; steps 63 and 64 belong to the group "metal 1 definition", etc.

The granulated semiconductor manufacturing process gives rise to barriers to improve the visibility of supply chain operations for customers and possibly also to supply chain vendors. In a workflow of manufacturing an IC product ordered by a customer, the supply chain vendors generate a large amount of data to describe the status of the product at each step. This data is often referred to as work-in-progress (WIP) updates. FIG. 2D shows one example of a typical WIP update for one lot received from a foundry vendor. The WIP update bears a time stamp indicating when it was created by the foundry vendor. The WIP update also includes some general information, such as the foundry ID and lot ID. The current status of the lot is identified by the current step (which shows that the lot was in the step "WAF1-START" when the WIP update was created) and current quantity (which shows the current number of wafers remaining in the lot). The WIP update also includes some additional information: start size (i.e., number of wafers in the lot when the lot started production) and start date (the date when processing of the lot began) in this example. This type of WIP update is sometimes referred to as a "status" update.

WIP updates can come in different formats. Another common form of WIP update includes the entire sequence of steps executed since the last update (typically including quantity and time of completion) rather than just listing the current step. This type of WIP update may be referred to as a "transaction history" update. In this case, the completion of every step typically is time stamped.

Further, vendors typically will generate WIP updates on a periodic basis for all WIP in their process. The resulting amount of data is voluminous. For example, assume that a small size fabless semiconductor provider has an annual revenue of $100 million. At an average price of $20 per chip, this fabless semiconductor provider must outsource the manufacturing of 5 million units per year. Assume that an average wafer contains 400 units and 25 wafers compose a lot, then the fabless semiconductor provider deals with 12,000 wafers or about 500 lots each year. Assuming that the average cycle time of one lot is about 4 months, at any one time, the fabless semiconductor provider will have about 167 lots in the supply chain. If the fabless semiconductor vendor receives WIP updates 3 times a day for each lot, the fabless semiconductor provider will receive 500 WIP updates per day. Such an overwhelming amount of manufacturing data and information can hardly be handled in a reliable manner without automation.

The raw WIP updates are also not meaningful to customers. For example, stating that there are 25 wafers in step "WAF1-START" is not meaningful unless the customer is familiar enough with the foundry's process to understand where this particular step lies. Typically, customers do not have this level of familiarity. In addition, the raw WIP updates relate directly to individual units on the supply chain, such as Lot ID 5910-1 as shown in FIG. 2D. Upon receiving the raw WIP update, customers still cannot determine whether the entire order can be delivered at scheduled time since the entire order may involve numerous lots. In addition, the raw WIP update does not indicate the lot routing through the entire supply chain. As a result, the raw WIP updates from individual vendors fail to provide sufficient visibility for the customers to meaningfully track the supply chain operation.

Customers usually are not concerned about what occurs at each specific step of a supply chain vendor. Instead, customers typically want reliable information on whether the ordered IC products can be delivered at the desired date and in the desired amount. Customers typically also prefer to use a user-friendly interface to track the semiconductor supply chain. The information that a customer usually wants is essentially a real-time update of the customer delivery schedule. For example, a WIP report of "We expect 4000 good parts to ship in 25 days" is typically more meaningful to customers than one which states "There are 25 wafers in step 'WAF1-START'."

Referring again to FIG. 1, there is provided a WIP tracking system 100 which generates WIP tracking reports and advance notices to significantly improve the capability of supply chain vendors and customers to track the status of the manufacturing process. The generated WIP reports and advance notices can also be used to coordinate supply chain vendors and reduce semiconductor manufacturing cycle time.

In one embodiment, the WIP tracking system 100 is controlled by a fabless semiconductor provider. The fabless semiconductor provider may follow an ASIC, ASSP or a other business model. As described above, the fabless semiconductor provider typically can integrate resources on a semiconductor supply chain and manufacture IC products for a customer 105. The fabless semiconductor provider coordinates with the supply chain vendors to establish WIP tracking system protocols, such as contents, format and frequency of WIP updates, the manner to identify individual units of products on the supply chain, etc. The protocols may be simple or complex and may differ from one vendor to the next. Ideally, all vendors would use a common protocol which is directly compatible with the WIP tracking system 100. In reality, however, each vendor may dictate its own protocol.

The fabless semiconductor provider receives the WIP updates from supply chain vendors. The data contained in the WIP updates may be relevant to different customers, different products and/or different orders for a product. The WIP tracking system 100 processes the WIP updates received from the supply chain vendors and generates various WIP reports, which are made available to supply chain vendors and customers, as well as for internal use, as applicable.

The WIP tracking system 100 maintains the confidentiality interest of the supply chain vendors and customers by adopting a targeted "push" mode in the WIP tracking system information. The WIP tracking system 100 does not allow the supply chain vendors and customers to have unfettered access to the WIP database. Rather, the WIP tracking system 100 handles the processing of WIP updates and creates specific WIP reports and advance notices according to the predetermined rules or expected needs of the supply chain vendors and customers. The WIP tracking system 100 makes the WIP tracking reports available to customers and for internal use. It also sends out advance notices to the downstream vendors within the supply chain. For example, the WIP tracking system may send the WIP reports and advance notices to the relevant parties or it may allow the relevant parties to retrieve or access the WIP reports and advance notices. As one example, a customer can retrieve information via the Internet from the WIP tracking system 100 regarding the number of good parts expected to be delivered on a scheduled date. However, the WIP tracking system 100 does not permit supply chain vendors or customers to obtain information in a way that violates the confidentiality of other vendors or customers. In this way, supply chain vendors keep confidence in the WIP tracking system and benefit from the exchange of data with the WIP tracking system.

In alternate embodiments, the WIP tracking system 100 is provided by an entity other than a fabless semiconductor provider. Such independent entity may be established for the purpose of managing the WIP tracking system. Entities that directly or indirectly contract with some or all of the supply chain vendors may be good candidates for controlling the WIP tracking system 100.

In another embodiment, the customer itself may manage the WIP tracking system 100, for example if the customer contracts directly with the supply chain vendors. Although FIG. 1 shows the WIP tracking system 100 as separate from the customer 105, this is done for ease of description and does not preclude a customer from managing the WIP tracking system 100.

Referring again to FIG. 1, the WIP tracking system 100 operates as follows to generate WIP tracking reports for the supply chain vendors. The WIP tracking system 100 contains a data representation of the supply chain 102, the current status of WIP in the supply chain and the statistical model of process durations and yields. The WIP tracking system 100 receives periodic WIP updates from the vendors and updates the data representation of the supply chain to reflect these WIP updates. Based on the updated data representation of the supply chain, the WIP tracking system 100 generates WIP tracking reports in a form suited for customer 105 and internal use. It may also generate advance notices that are to be sent to the various vendors.

For example, the WIP tracking system 100 might receive a WIP update from vendor 1. Based on the analysis of the data representation, it will generate a set of WIP tracking reports for customer 105 and for internal use by the system 100, and also send an advance notice to vendor 2 so that vendor 2 can better plan for activity related to the WIP currently at vendor 1. The WIP update from vendor 1 may result in multiple advance notices, for example to vendor 3, 4, etc. in addition to vendor 2. Likewise, the WIP tracking system 100 might receive a WIP update from vendor 2 and generate advance notices to other vendors resulting from the WIP update. The rules for generating tracking reports and advanced notices are typically predetermined.

The WIP tracking system 100 might also generate WIP tracking reports for the customer 105, depending on the needs of the customer 105. In one approach, the customer 105 is considered to be a part of the supply chain 102. The supply chain 102 begins with an order from the customer 105 and ends with the delivery of final tested and packaged IC products to the customer 105.

In addition, reliable WIP tracking reports reassure customers that the supply chain manufacturing process is on track (or is not on track, depending on the content of the tracking report). Either way, scheduling uncertainty in the supply chain is reduced. As a result, the customer and supply chain vendors can reduce padding the schedule and can proceed with greater confidence toward meeting the delivery target. For example, the customer can schedule subsequent marketing activities with greater certainty once the ordered IC production is two-thirds complete according to WIP tracking reports.

One advantage to using a fabless semiconductor provider is that it can collect accurate project data and perform a statistical analysis of past performances across a large arrays of products and vendors. This empirical data helps to further reduce uncertainties in scheduling.

Figure 3:
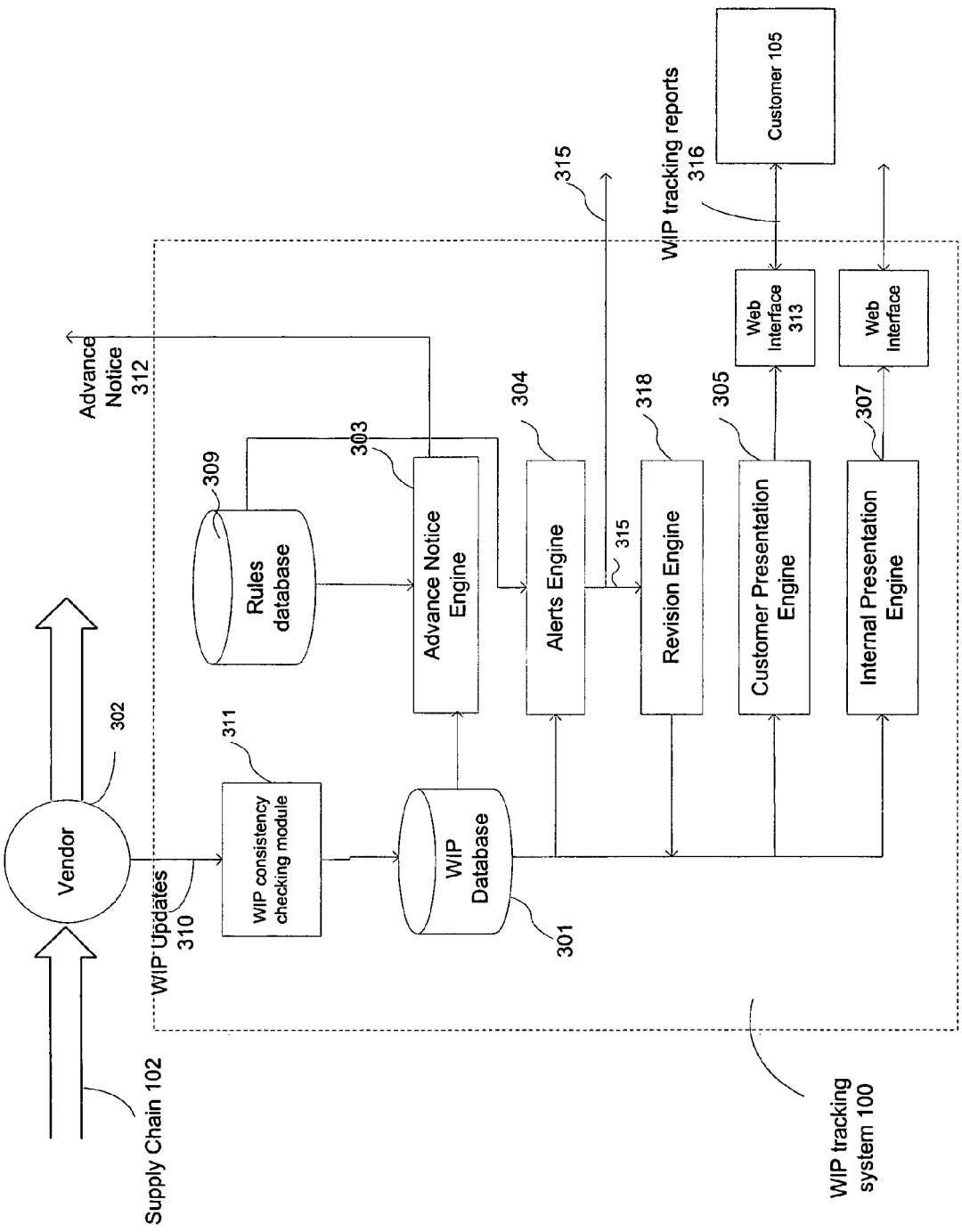
FIG. 3 is a schematic diagram illustrating an embodiment of a supply chain WIP tracking system.

FIG. 3 shows one embodiment of a WIP tracking system 100. The WIP tracking system 100 includes a WIP update consistency checking module 311, a WIP database 301, an advance notice engine 303, an alerts engine 304, a revision engine 318, a customer presentation engine 305, an internal presentation engine 307, a rules database 309 and a web interface 313. The engines 303, 304, 318, 305 and 307 can access the WIP database 301 and the rules database 309. For purposes of advance notices, the relevant part of the rules database 309 shall be referred to as the advance notice rules database 309. The engines 303, 304, 318, 305 and 307 may also communicate with each other. In one implementation, a WIP database 301 is implemented as an Oracle database and the engines 303, 304, 318, 305 and 307 are implemented as Enterprise Java Beans (EJB), Java Servlets, JavaScript, XSLT transformations and Java Server Pages (JSP). Portions of the rules database are implemented as XML files.

The various engines 303, 304, 318, 305 and 307 are shown as separate functional blocks in FIG. 3 for clarity of explanation. In reality, they may be implemented using common technology. For example, in one embodiment, the reports (not shown) generated by the internal presentation engine 307 include the WIP tracking reports 315 generated by the customer presentation engine 305. Thus, the customer presentation engine 305 and the internal presentation engine 307 may share much of the same software. Alternately, the customer presentation engine 305 may not exist separately. Instead, it may be a subset of the internal presentation engine 307.

Figure 4:
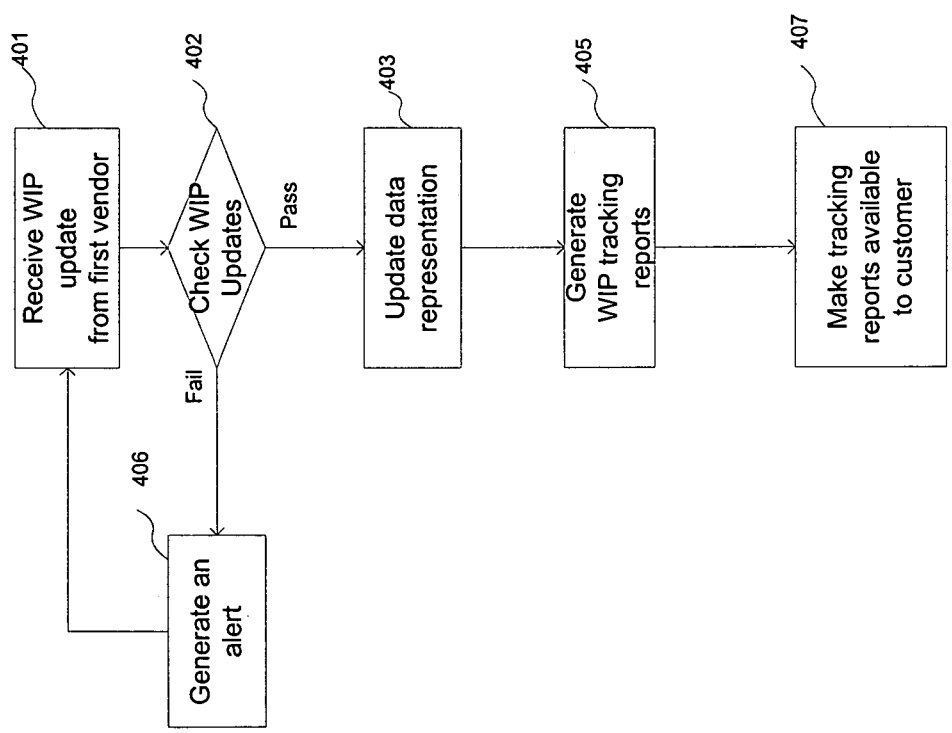
FIG. 4 is a flow chart illustrating steps of generating a WIP tracking report.

As described above, the WIP tracking system 100 receives WIP updates 310 from supply chain vendors 302 and generates WIP tracking reports 316 and advance notices 312 for supply chain vendors and customers. FIG. 4 illustrates a flow chart for one method of operating WIP tracking system 100. The WIP database 301 stores a data representation of the semiconductor supply chain 102, including the current status of WIP in the supply chain. Now assume that a WIP update 310 is received 401 from a first vendor 302.

The WIP updates consistency checking module ("consistency module") 311 checks 402 the received WIP update for completeness and accuracy. As an example, the consistency module 311 identifies if a WIP update contains a time stamp, the current step name, quantity of WIP, and/or if the current WIP update refers to an active lot on the supply chain, etc. The consistency module 311 may also check other consistency within the WIP updates, for example if the received update adheres to certain format.

If the information within the WIP update is missing or erroneous, the WIP update consistency checking module 311 may generate 406 an alert to report the problematic WIP update to the WIP tracking system 100 or the entities controlling the system. Upon receiving the alert from the consistency module 311, the WIP tracking system 100 may obtain correct or complete WIP updates from the vendor. If the WIP update passes the check 402, the data representation stored in the WIP database 301 is updated 403 by the revision engine 318 to reflect the WIP update 310.

The customer presentation engine 305 analyzes the updated WIP database 301 to generate 405 WIP tracking report(s). The tracking reports are made available 407 to the customer. For example, the WIP tracking report may be delivered by electronic mail, facsimile or any other common communications means. Alternately, the customer may access the WIP tracking report over the Internet (for example via web interface 313) of some other network.

In some sense, the customer presentation engine 305 generates the customer's "window" to the WIP database 301. As will be further illustrated, this engine 305 generates WIP tracking reports tailored to the business needs of customers. In one embodiment, the WIP tracking reports illustrate the amount of WIP at different phases of the manufacturing process, where the amount of WIP is expressed in units of expected good parts. Other WIP tracking reports provide reports on customer delivery schedule, order status, supply chain vendor performance, etc. As a result, the customer can gain better visibility into the IC manufacturing process.

Figure 12A:
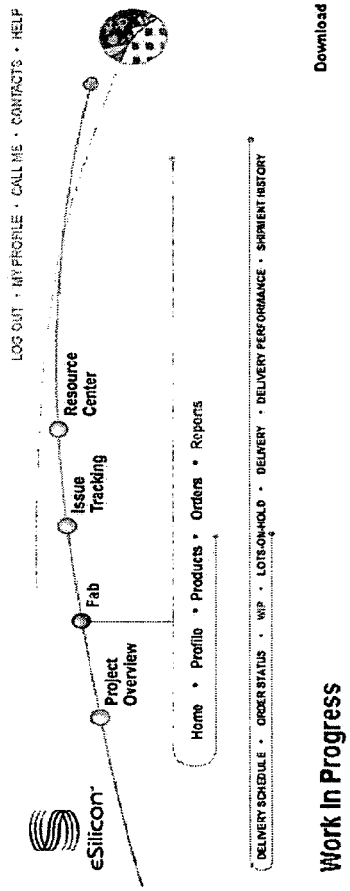
FIG. 12A illustrates a WIP tracking report on the distribution of WIP along the supply chain.
Figure 12A:
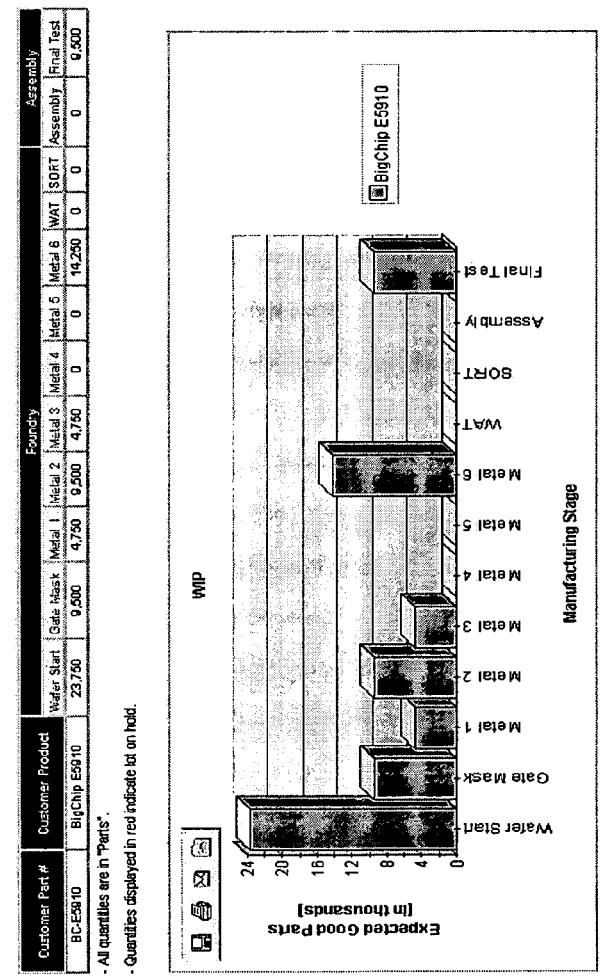

FIG. 12A shows one example of a customer WIP tracking report. In this example, the WIP tracking report shows the amount of WIP at different stage of the semiconductor manufacturing process, where the amount of WIP is expressed in units of expected good parts. This information is expressed as both a bar chart and a table. The horizontal axis of the bar chart shows a chain of semiconductor manufacturing stages: Wafer Start, Gate Mask, Metal 1, Metal 2, . . . Sort, Assembly, Final Test. The vertical axis shows the amount of WIP which is currently located in each stage, where the unit of measure is expressed in expected good parts. Thus, the example of FIG. 12A gives a snapshot of where all WIP is currently located for the customer order "Big ChipES5930." As the semiconductor manufacturing moves forward, the WIP will also progress from stage to stage.

One of the benefits provided by the WIP tracking reports created by customer presentation engine 305, including those shown in FIG. 12, is the improvement of the customers' visibility into the supply chain IC manufacturing process. For example, compare the WIP report generated in FIG. 12A with the raw WIP updates received from the vendors, as shown in FIG. 2D. The raw WIP updates typically state the volume of WIP at each step of a vendor's process, with the volume given in units which are suitable for that particular step. In contrast, the WIP reports shown state the volume of WIP at each stage of the entire supply chain, with the volume at all stages given in expected good parts.

Note the following differences between the raw WIP updates and the WIP reports. First, the raw WIP updates report volume on a per-step basis, whereas the WIP reports report on a per-stage basis. As described above, the semiconductor manufacturing process may be divided into a number of major stages or tasks which are generally understood within the industry. Such stages for a foundry might include Wafer Start, Gate Mask, Metal 1, Metal 2, etc., as shown in FIG. 12A. In reality, each stage includes multiple steps. For example, the foundry process shown in FIG. 2C includes 121 steps but only 10 stages. A WIP report which reported the volume of expected good parts at each of the 121 steps is not as informative or meaningful as one which reports on a per-stage basis.

To achieve the per-stage reporting, the customer presentation engine 305 aggregates WIP volume across all steps within a stage. For example, instead of reporting the WIP at each of the steps in the stage "Metal 1", the customer presentation engine 305 reports to the customer the total WIP in all steps of the stage "Metal 1." As a result, the customer will gain a clarified message as to current supply chain status.

WIP volumes can also be aggregated across multiple vendors. For example, assume that a customer order is split between two foundry vendors. The first foundry vendor uses a 107 step process and the second foundry vendor uses a 124 step process. A WIP report detailing the amount of WIP in each of the 107 steps and in each of the 124 steps is not particularly useful, as described above. There is an additional problem in that the customer will have difficulty comparing the WIP in the 107 step process with that in the 124 step process. In contrast, in one implementation, the customer presentation engine 305 maps both processes to the same basic stages. For example, steps 53–64 of the 120 step process and steps 44–57 of the 107 step process may all map to the "Metal 1" stage. As a result, WIP across multiple vendors can be aggregated with the total volume in Metal 1 reported. Alternately, separate reports can be given for different vendors, but comparison is easier since both reports use the same stages. The mapping of steps to stages can also be customized rather if that would be advantageous.

Another difference between the raw WIP updates and the WIP reports is that the WIP reports measure volume in expected good parts. Again, this typically is a more meaningful measure for the customer. In contrast, the raw WIP updates use a variety of different units: lots, wafers, die, tested and untested parts. The conversion from the current units of WIP to expected good parts is based on the estimated yields for the remaining steps in the process. In one implementation, this is achieved by calculating conversion factors for each step, as will be described further below.

Another difference between the raw WIP updates and the WIP reports is that the WIP reports can give an overall view of the entire supply chain from different perspectives. In contrast, each WIP update gives, at most, a view of that particular vendor's process.

Figure 12B:
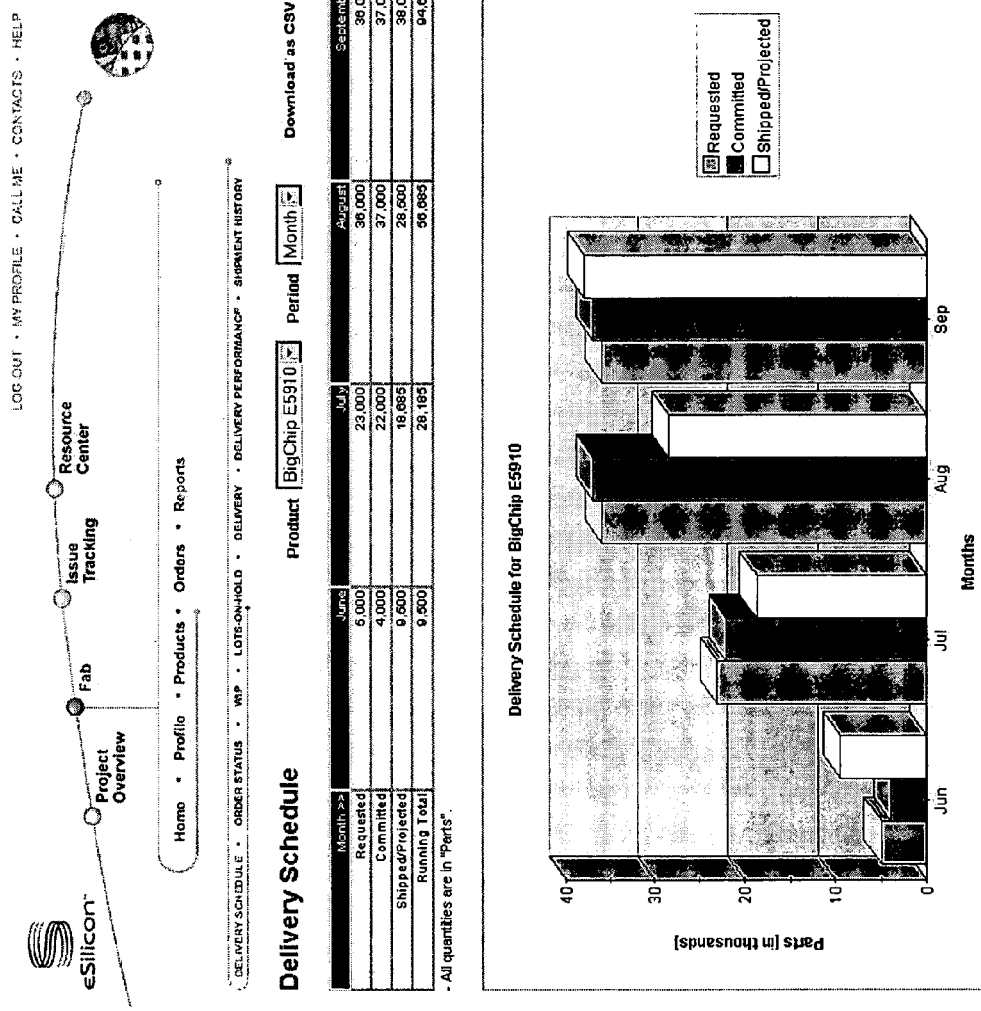
FIG. 12B illustrates a WIP tracking report on the customer delivery schedule.

FIG. 12B shows another example of a WIP tracking report: a customer delivery schedule chart. The customer delivery schedule chart shows the estimated quantity of finished goods to be delivered to a customer on certain dates. For past dates, the chart reflects past, actual deliveries. For future dates, the chart is a reflection of current WIP which will be converted to future good parts at some yield rate.

The customer delivery schedule has a horizontal axis showing a time line divided into weeks, months or other time intervals, as configured by the WIP tracking system 100 or customer. On the vertical axis are the expected good parts. In FIG. 12B, each time period has three different quantities: "Requested", "Committed", and "Shipped/Projected." "Requested" is the volume requested by the customer. "Shipped/Projected" are quantities which have been shipped or which are expected to be shipped. "Committed" are quantities which are in process or which are expected to be in process. For example, lots have been started but finished product has not yet been shipped. Future quantities are based on estimates made by the WIP tracking system 100, typically taking into account factors such as yield and vendors' past performance. Thus, a customer not only knows from FIG. 12B the requested and past shipped parts from the supply chain, but also gains a clear picture of how many good parts are expected in the future.

Accordingly, the customer delivery schedule is a useful tool to assist a customer to make business decisions. For example, if the volumes predicted by the customer delivery schedule in the next three months are not sufficient to meet a customer's production goals, the customer may quickly decide to outsource additional production manufacturing to other vendors. Thus, the customer may quickly respond to market demand and avoid any potential loss.

Figure 12C:
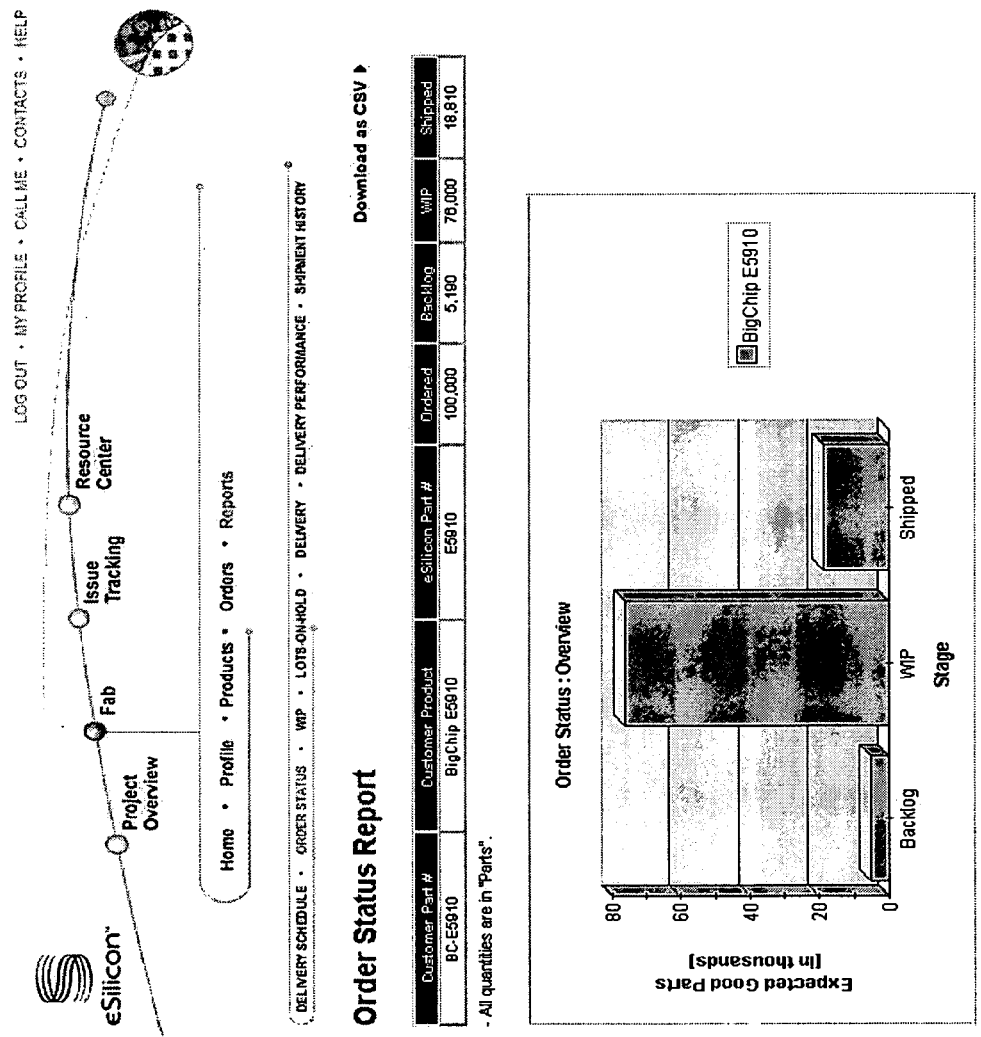
FIG. 12C illustrates a WIP tracking report on order status.

As a final example, FIG. 12C is a WIP tracking report on the status of an order. In this example, the customer's total order is divided into three general categories: backlogged, WIP and shipped. Shipped parts have already shipped. WIP is material which is in process. WIP volume is expressed in expected good parts. The WIP tracking system converts between actual WIP volume and expected good parts. Backlogged parts are those which have not begun processing yet.

Other WIP tracking reports can also be generated. For example, a chart of delivery performance for vendors provides details on the normalized performance of a supply chain vendor, e.g., how well the vendor keeps promises to deliver good parts by a certain date. As described below, the WIP tracking system 100 is capable of using a statistical model to monitor each vendor's performance, e.g., expected duration at each step or expected yield at each step. The results derived from the statistical model not only enable a reliable estimation of shipment time and deliverable quantities but can also provide customers information on the overall performance of a supply chain vendor. Other examples of WIP tracking reports include "Shipment History" and "Lots-on-hold" reports. "Shipment history" gives a detailed history of time and quantities of finished and shipped parts. "Lots-on-hold" gives an immediate view of the problems in the supply chain through a look at the lots that have been put on hold. The examples of FIG. 12 show bar charts and tables, but other formats include, for example, an internal data representation in the form of a XML data encapsulation.

Compared to the raw data information in conventional WIP updates, all these WIP tracking reports distinctively improve customers' visibility of the supply chain from different perspectives. The WIP tracking reports contain reliable estimation of the completion time and quantities of expected good parts and other related information for customers. In addition, although the WIP tracking reports have been discussed in the context of the customer, they can also be generated with respect to vendors in the supply chain.

Referring again to FIG. 3, the alert engine 304 generates alerts 315 for internal use by the WIP tracking system 100. The alerts may also be sent to the entity controlling the WIP tracking system 100 (e.g., the fabless semiconductor provider). The alert engine 304 analyzes the WIP database 301 to monitor if the current status of the supply chain deviates in schedule or quantity from the expected values, according to predetermined rules.

Alerts 315 are received by the revision engine 318. Upon receiving the alerts 315, the revision engine 318 determines whether to update the WIP database 311. The WIP database 311 typically contains estimates of future actions as well as a record of past events. Thus, if WIP is behind schedule, the revision engine 318 may revise the future estimates in order to generate a more reliable estimate of customer delivery date and to avoid the repetitive generation of alerts for events, such as delays or material scraps, that happened in the past.

The internal presentation engine 307 generates WIP tracking reports for the WIP tracking system 100's internal use. It is the WIP tracking system 100's "window" to the WIP database 301. The WIP tracking reports described above in the context of customer presentation engine 305 can also be generated by internal presentation engine 305.

The "internal" window generated by engine 307 and the "external" window generated by engine 305 may not be the same. For example, consider the case of a fabless semiconductor provider which is procuring chips on behalf of a customer. In one embodiment, the fabless semiconductor provider's WIP tracking reports (i.e., those generated by the internal presentation engine 307) accurately reflect the status of the supply chain 102. In contrast, the customer's WIP tracking reports (i.e., those generated by the customer presentation engine 305) may be modified.

Figure 11:
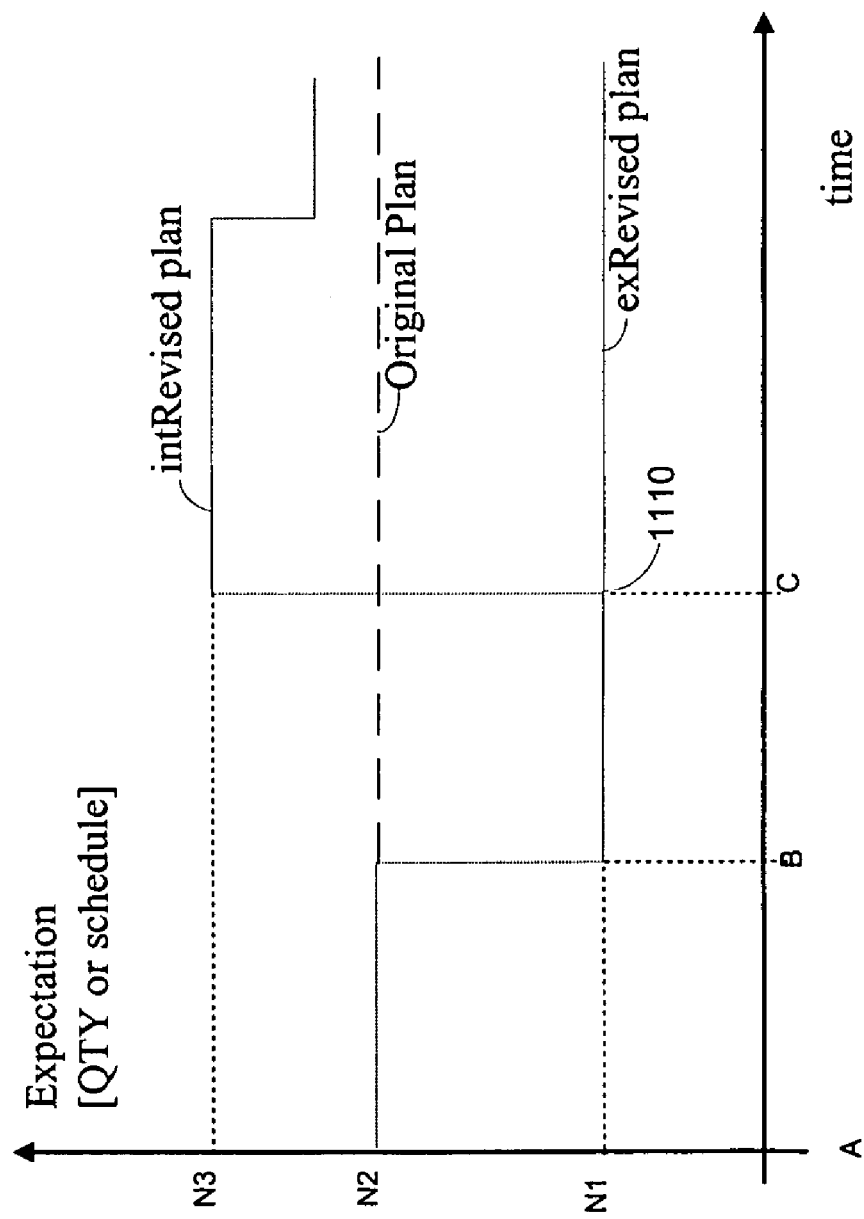
FIG. 11 is an illustration of reducing the amount of negative news reported by a WIP tracking system.

For example, FIG. 11 illustrates a case in which the customer's WIP tracking reports are modified in order to reduce the amount of negative news reported to the customer. According to this scheme, if the WIP is ahead of schedule (i.e. if steps in the supply chain are completed prior to the scheduled date or the number of expected good parts exceeds the promised amount), the customer presentation engine 305 is configured to report that the WIP is on schedule but not ahead of schedule, both in terms of time and quantity. If there is a later delay or yield loss due to a downstream activity, the delay or quantity loss may be offset by the earlier, unreported schedule or quantity gains. The internal presentation engine 307 is configured to reflect the actual state of WIP, including if the WIP is ahead of schedule in time or quantity. This approach reduces the number of times the customer receives negative news.

For example, FIG. 11 shows the change in the number of good parts that are expected to be delivered to the customer as a function of time. The horizontal axis shows time. The vertical axis shows the number of parts to be delivered to the customer. Because of the regular WIP updates received by the WIP system, the prediction of the number of parts changes with time. The dashed line labeled "Original Plan" shows the original plan. According to the plan originally agreed upon with the customer, a quantity N2 of parts is expected to be delivered. Since the "Original Plan" was agreed upon previously, it remains unchanged despite the realities of the process. The curve labeled "intRevised plan" reflects the estimate of the deliverable part quantity, the estimate being based on the actual quantities currently being completed by the vendor. This curve is the most accurate knowledge about the WIP, and is reported by the internal presentation engine 307. The curve labeled "exRevised plan" is the quantity that is reported by the customer presentation engine 305, and is a filtered version of "intRevised plan" generated based on the use of the technique described above.

During the period from time A to time B, the actual progress being made is equal to the original plan, so the number of deliverable parts predicted (intRevised and exrevised) are both equal to the Original Plan. From time B to time C, the production falls below the Original Plan. This gets reflected in intRevised and exRevised, since the negative news is presented to the customer. Both the intRevised plan and exRevised plan are revised downward to quantity N1 to reflect this production fall. At time C, the vendor improves its workflow and the completed parts rises to N3, exceeding the Original Plan. If the technique described above is implemented, the customer presentation engine 305 does not adjust the exRevised plan upward. At the same time, the actual amount is directly reflected in intRevised plan. At the end of production, exRevised is set to be equal to intRevised. This technique minimizes the number of time the customer has to receive negative news.

One of the advantages of this technique is its adaptability to the reality of a supply chain and maximization of customer expectation throughout the cycle time. This is particularly useful given the high rate of project delays or overdue occurrence in an actual semiconductor manufacturing process. Instead of disclosing every actual delay occurrences or other discrepancies to the customer, the WIP tracking system 100 uses this technique properly to maintain a persistent customer's positive expectation to the scheduled product delivery by withholding good news at certain point, thereby lowering the incidence of negative reports.

Figure 5:
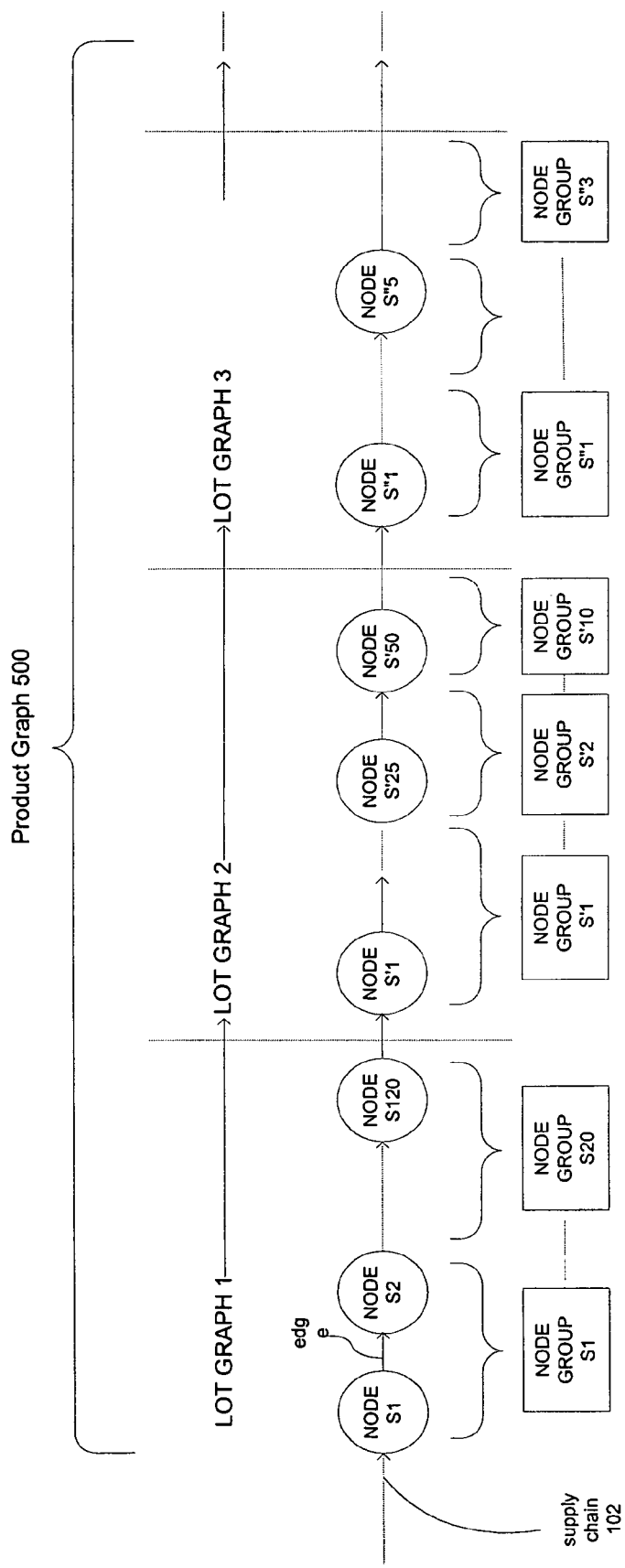
FIG. 5 illustrates a graph-based data representation of a WIP tracking system.
Figure 6:
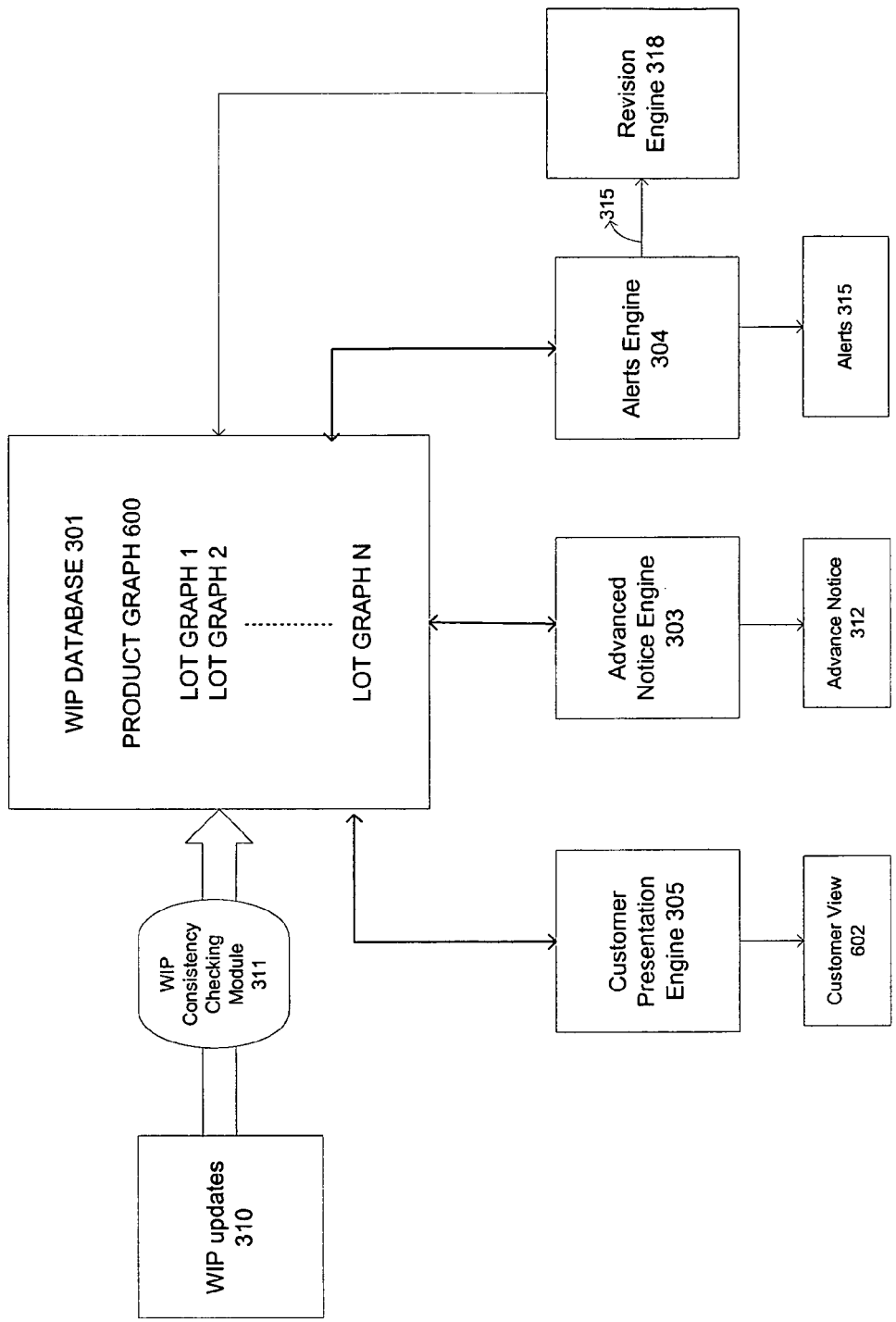
FIG. 6 is a schematic diagram illustrating operation of WIP analysis under the graph-based model as illustrated in FIG. 5.

As described previously, the WIP database 301 includes a data representation of the supply chain 102. FIGS. 5 and 6 show one way of implementing the data representation, which in this case is a graph-based model. The graph-based model is capable of supporting the various functions provided by the various engines described above.

The WIP database 301 includes a product graph (PG) for each distinct product to be manufactured. Orders for products typically are subdivided. One typical unit used in the semiconductor chain is a lot. For example, a lot may contain 25 wafers. Conventional WIP updates contain data with respect to each of the lots at a supply chain vendor. Correspondingly, as shown in FIG. 6, each product graph 600 is a collection of lot graphs (LGs), such as lot graphs 1, 2, . . . n. When the customer orders a product for the first time, a product graph is created to represent that product. When a new lot for that product is started, a lot graph(s) is created within the product graph to represent the supply chain and the progress of that lot through the supply chain. As the lot moves through the supply chain, however, it may be split into two or more lots, or joined with one or more other lots, following the internal logic of the vendors' practices. In a simple case, a single lot graph may represent a lot as it passes through all vendors in the supply chain. Alternatively, separate lot graphs may be merged together when different lots merge at a certain supply chain vendor or a lot graph may be split into a plurality of lot graphs if a lot in a supply chain is split and routed to different locations. One advantage of a graph-based representation is that these operations can be implemented efficiently.

FIG. 5 shows the data representation of the entire supply chain for one lot of a product. The data representation in FIG. 5 corresponds to the supply chain 102 shown in FIG. 1. In this case, a separate lot graph is generated for each vendor: lot graph 1 for vendor 1, lot graph 2 for vendor 2, etc. Each lot graph includes a plurality of nodes. In the example shown, each node corresponds to one of the process steps performed by the supply chain vendors: Step s1 is represented by node s1 in lot graph 1; step s'50 performed by vendor 2 is represented by node s'50 in lot graph 2, etc. The edges in FIG. 5 indicate interactions between the nodes of the lot graphs, i.e., between the process steps on the semiconductor manufacturing process. In one embodiment, the edges specify the order of execution of the steps. The edges between nodes internal to a lot graph (e.g., the edge from node s1 to node s2) may be represented by pointers internal to the lot graph or may even be implied by convention. The edges between nodes in adjacent lot graphs (e.g., the edge from node s120 to nodes' 1) may be implemented because lot graph 1 points to lot graph 2, thus implying that there is an edge between the last node in lot graph 1 and the first node in lot graph 2.

FIG. 5 also shows a plurality of node groups associated with the lot graphs. For example, a node group s1 corresponding to nodes s1 and s2 is associated with lot graph 1. As shown in FIG. 2C, the multiple steps done by a supply chain vendor can be grouped into step groups. Correspondingly, in the graph-based representation of the supply chain 102, the nodes can be grouped into node groups.

The graph-based model illustrated in FIG. 5 may be implemented in many ways. In one approach, an object-oriented computer language is used to implement the data structures shown. In one embodiment, each product graph, lot graph and node contains attributes for tracking WIP in the supply chain 102. The following are some examples. Other attributes may also be used.

Examples of attributes contained by the product graph include the customer's identity, the customer's part number for the product, and the fabless semiconductor vendor's part number for the product. Examples of attributes contained in the lot graph are the lot number, the identity of the vendor(s), the purchase order for the lot, and the time of the last WIP update received.

Each node contains data indicating when WIP passed through (or is expected to pass through) that node. For example, node attributes might include a unit of measure indicating the unit of measure for WIP in that node (e.g., wafer, die, etc.). Node attributes might also include quantity, start time and duration. These indicate the quantity of WIP which entered the node, the start time when they entered the node and the duration of time they remained in the node before exiting for the next node. Each of these attributes may be further subdivided into an original estimate, the actual value, and intRevised and exRevised values to support internal and customer presentations, as described above.

In addition, each node has an attribute conversion factor, which is used to estimate the expected good parts or quantity for customer delivery. The conversion factor is the factor which converts between the quantity of WIP at the current node and the final expected good parts. The conversion factor is determined by taking account of the expected yield for all of the remaining steps in the supply chain.

As an example, the computation of the "Expected Good Parts" (EGP) based on the quantity of WIP at the current node may be represented as follows:

$$EGP(StepK) = QTY(StepK) * ConversionFactor(StepK)$$

where StepK is a step in the supply chain as illustrated in FIG. 3, QTY(StepK) is the current quantity of WIP at StepK as measured in the units of measure of StepK. ConversionFactor accounts for the yield from StepK to the final product and also accounts for differences in units of measure. For example, if quantity at StepK is measured in wafers, then ConversionFactor also accounts for the number of dies per wafer, assuming that final good parts are measured in dies. The yield portion of ConversionFactor can be estimated by accumulating the incremental yield of each step remaining in the supply chain. In other words:

$$\text{Yield from StepK to end of supply chain} = \text{Yield}(\text{Step i})$$

where the product is taken over all steps after StepK and Yield(Step i) is the expected yield of step i.

Since supply chain vendors typically do not provide a yield estimate for every step (node) and manual entry of a yield per step is cumbersome, in an alternate embodiment, the steps are grouped into "yield groups," each of which has a yield factor. The conversion factor is based on the number of yield groups left in the supply chain (as opposed to individual steps remaining). For example, typical yield groups might include process, sort, assembly, and final test. In other words, certain steps are assigned to the yield group "process," others to "sort" and so on. Each yield group is represented by a single number, which represents the cumulative yield of all steps in that group. In this model, the conversion factor for any step in a particular process yield group would be the cumulative yield of all yields groups from the current one to the final product, plus a factor accounting for differences in units of measure. Note that different process flows will have different steps. Thus, it is important to map each step to a specific yield group in order to calculate its conversion factor.

It should be understood that the attributes given above are examples. Other attributes and/or other data structures can be used to track the progress of WIP through the supply chain.

FIG. 6 shows operation of the graph-based model for WIP tracking and analysis. A product graph 600 in the WIP database 301 represents a specific order for a particular part. The lot graphs 1, 2, ... n contained in the product graph 600 represent the lots working their way through the supply chain. Different lots may utilize different supply chains.

During operation, WIP updates 310 are received from supply chain vendors, typically at regular time intervals. If the arriving WIP updates 310 indicate that a new product type is now active in the supply chain, the WIP tracking system 100 creates a new product graph for that product. If the WIP updates 310 correspond to a new lot for an existing order, a new lot graph(s) may be added to the appropriate product graph. The new lot graph will be initialized as described below. Further, the WIP tracking system 100 updates all the product graphs using the WIP updates 310. The WIP updates 310 are checked by the consistency module 311 to reduce the impact caused by any erroneous or missing WIP updates to a minimum.

To generate a customer view 602 of the WIP database 301, the customer presentation engine 305 reads all lot graphs under the relevant product graph 600. The WIP at each step of the manufacturing process is expressed in terms of final expected good parts by using the conversion factor of each node of the lot graphs. The customer presentation engine 305 sums up expected good parts across lot graphs (e.g., if multiple lots are in the same stage of manufacturing). It also reduces the node granularity, reporting expected good parts per node group rather than per node. The exRevised figures are used for customer reports. In this way, features for customers can be implemented. The customer presentation engine 305 generates an external presentation to the customer on the customer delivery schedule of expected good parts.

The WIP tracking system 100 also performs alert analysis for the product graph 600. Alerts 315 are messages generated for use internally by the WIP tracking system 100. If, for example, the expected good parts to be delivered under product graph 600 is fewer than a predetermined threshold, an alert may be generated to bring this to the WIP tracking system 100's attention. As another example, if WIP updates are expected but do not arrive or if they are not in the correct format or otherwise fail some simple checks, an alert might be generated.

One type of alert analysis identifies discrepancies between actual status and the expected status. Typically, the intRevised figures rather than the Original Plan figures will be used to represent the expected status. This is because the Original Plan represents the original estimate of schedule and quantities; whereas intRevised represents the most recent updated estimate of schedule and quantities. A comparison against intRevised avoids the generation of multiple alerts for the same "mishap." As soon as the alert has been generated, the intRevised values of completion time and quantity for future steps in the lot graph are updated by the revision engine 318. Revisions can also be triggered by the update of the statistical process flow model for completion time and yields. For example, if better models revise the yield predictions or estimated times, these revised estimates are updated for future steps in the lot graph.

Figure 7B:
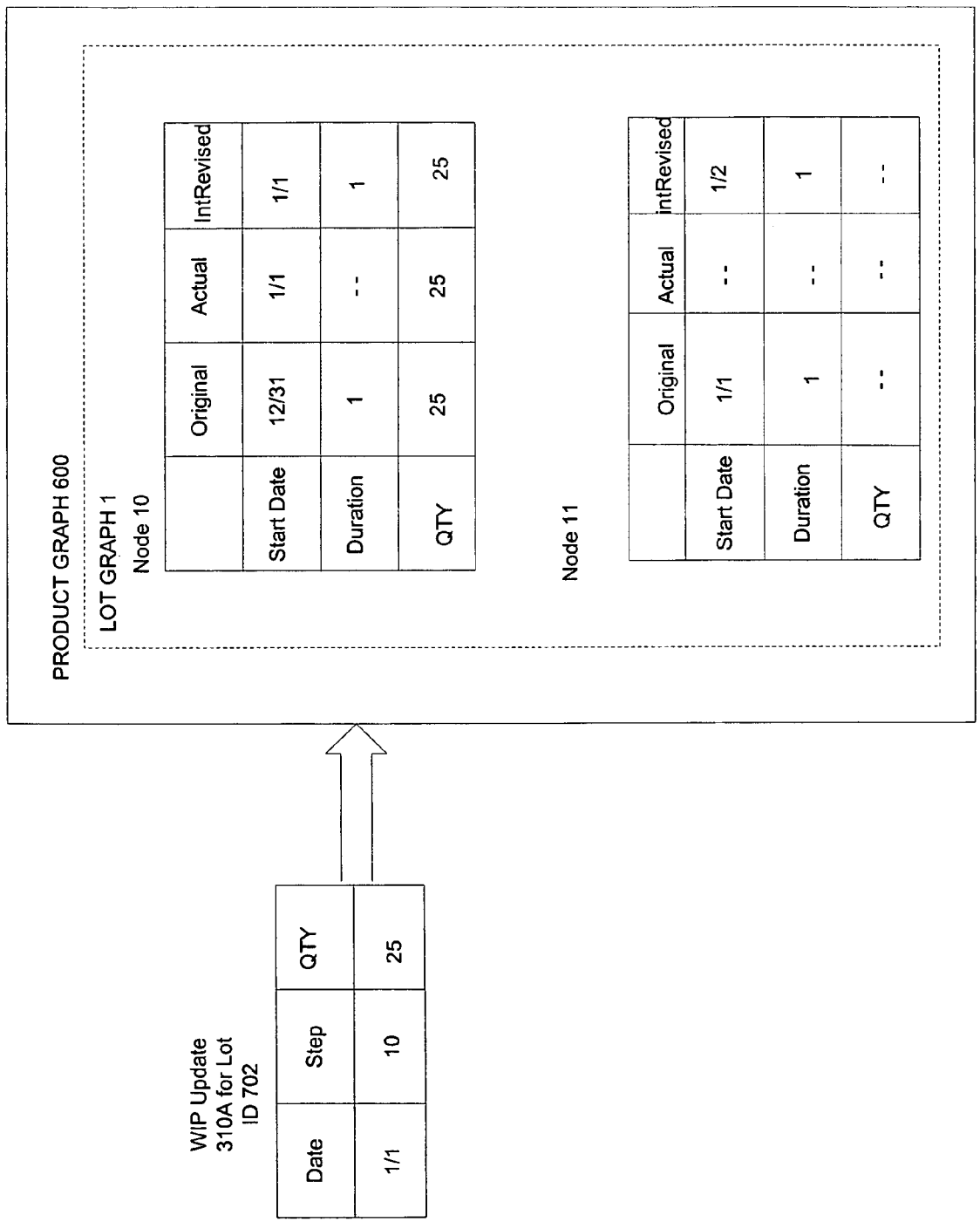
FIG. 7B illustrates an updating process of a graph-based WIP tracking system.
Figure 7C:
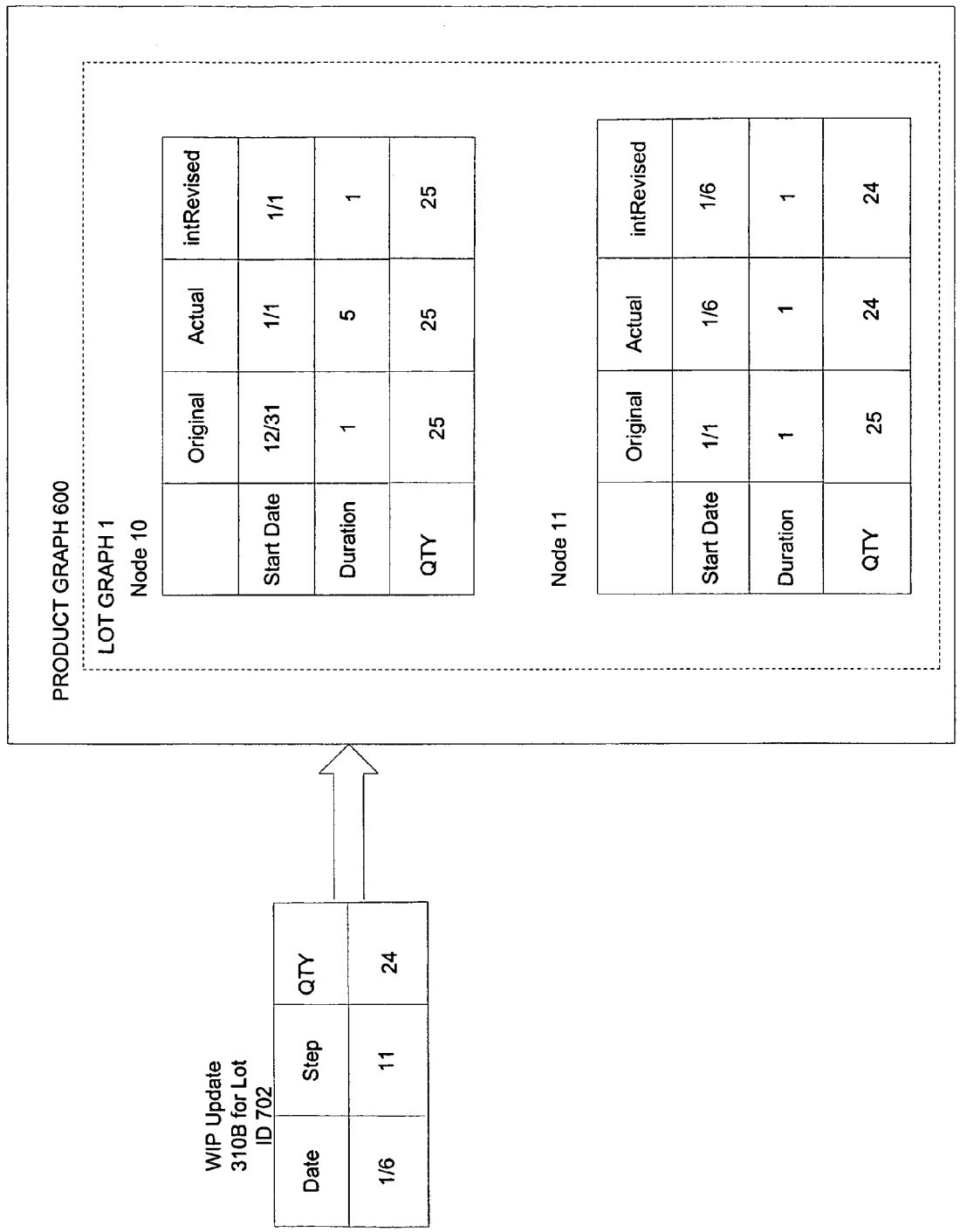
FIG. 7C illustrates an updating process of a graph-based WIP tracking system.

FIGS. 7A–7C illustrate in additional detail a process of initializing a lot graph and updating a lot graph. For ease of illustration, lot graph 1 of product graph 600 represents a Lot ID 702 that is currently processed by a vendor. For simplicity, assume that vendor has only one process which is described by process flow 709.

As described above, a lot graph for a product graph 600 is initialized when the corresponding order is submitted to the semiconductor chain vendor. In one embodiment, a process flow 709 is used to initialize lot graph 1. A process flow is basically a template for a vendor's process. It may have a similar data structure to a lot graph, but many of the attributes or fields are initialized to zero or not present. In the context of the example attributes given above, the process flow 709 for vendor's process includes a sequence of steps for the process, the original expected duration of each step and the original expected conversion factor. The sequence of steps is usually provided by the vendor. The duration and conversion factor of each step may be provided by the vendor, estimated, and/or statistically refined over time as actual data is collected. For example, a vendor may state that his process of 100 steps is estimated to take 80 days, in which case each step may initially be estimated to take 0.8 days.

Referring to FIG. 7A, the process flow 709 is used to initialize lot graph 1 which includes the vendor's process. Process flow 709 indicates that the vendor's process includes steps 10 and 11, so the corresponding lot graph 1 has corresponding nodes 10 and 11. In addition, the process flow 709 indicates that the expected duration for step 10 and step 11 is each 1 day and the conversion factor for both steps is 200. When initializing the corresponding entries in lot graph 1, the entry of original duration for node 10 (step 10) and node 11 (step 11) is thus 1 day and the entry for original conversion factor for both steps (not shown in FIG. 7A) is 200. The Original values typically will not change. The intRevised values are the same as the Original values since this is an initialization stage and no deviation from the original plan has yet occurred. The Actual start date, duration and QTY (quantity) values are left blank since the WIP in Lot ID 702 has not yet progressed to steps 10 and 11.

Referring to FIG. 7B, assume that WIP update 310A is received from vendor on 1/1 for Lot ID 702. The WIP update 310 indicates that Lot ID 702 entered step 10 on 1/1 and the quantity at that point was 25 (wafers). Therefore, lot graph 1 is updated to insert an entry "1/1" in the "Actual Start Time" for node 10 and to insert an entry "25" in the "Actual QTY". intRevised is updated similarly. In addition, the lot is now one day behind schedule, so intRevised start date for step 10 is revised to 1/2 to reflect the one day delay.

Not all status changes will be automatically reflected in the intRevised values, as the revision engine 318 updates the intRevised values according to its logic. In the example above, the intRevised start date for step 10 was delayed by one day to 1/2. However, in an alternate embodiment, delays are not reflected in intRevised unless they exceed a threshold. If the threshold for step 10 was two days, for example, then the intRevised start date for step 10 would not be revised. In another approach, the threshold is calculated as a percentage of the remaining processing time at that vendor. Thus, assume that step 10 is part of a 120 step process which is expected to take 90 days, the time from step 10 to the end of the process is estimated as 85 days, and the percentage threshold is selected as 10%. In this case, the calculated threshold at step 10 is 10% of 85 days=8.5 days and intRevised would not be changed.

In FIG. 7C, WIP update 310B is received, indicating that Lot ID 702 entered step 11 on 1/6 with 24 wafers. The Actual and intRevised start dates and quantities for node 11 are revised to 1/6 and 24 to reflect the actual start date and quantity. The Actual and intRevised durations for node 10 are also revised to reflect the actual duration of 5 days in step 10.

Figure 8:
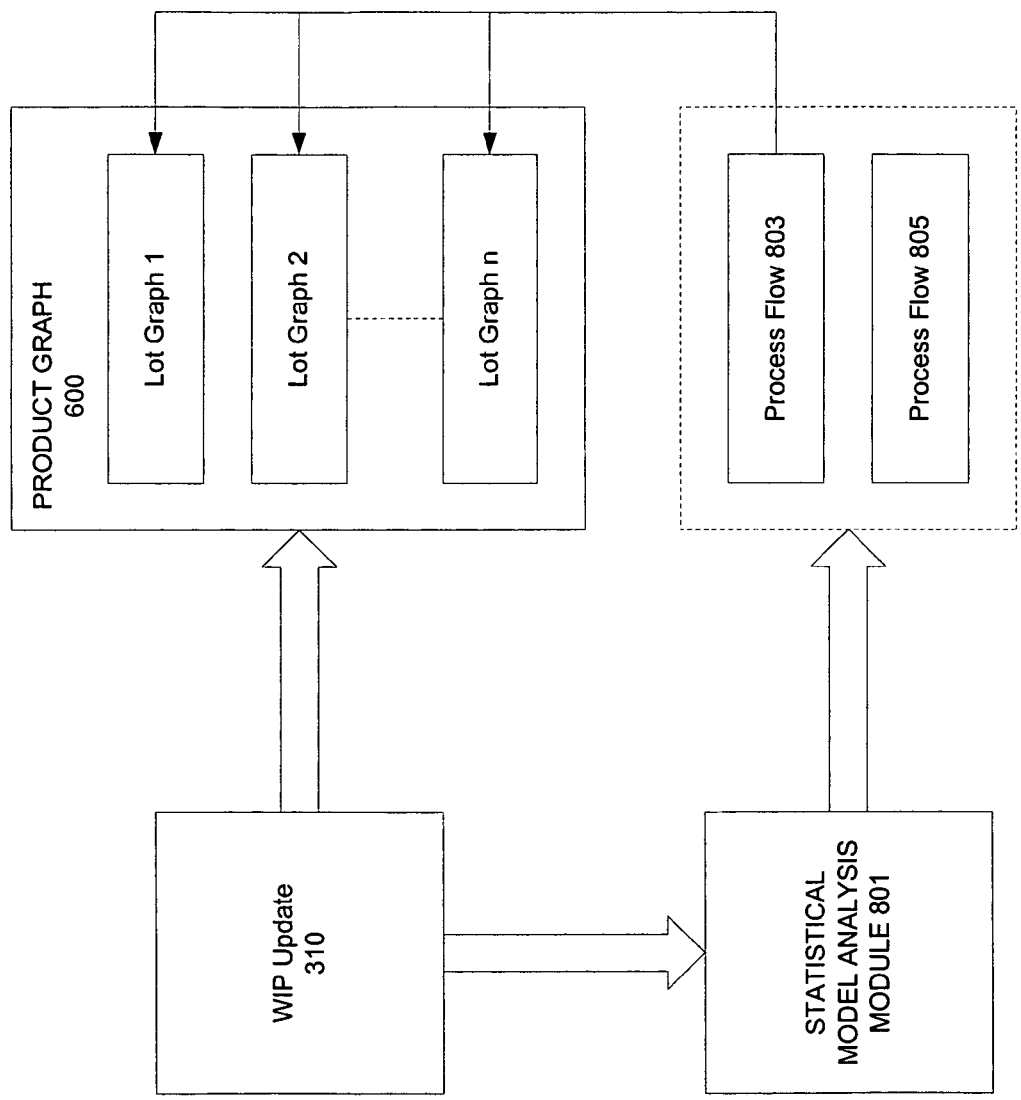
FIG. 8 illustrates a process of updating a graph-based WIP tracking system using a statistical model.

Referring to FIG. 8, the process flow can be used not only for initializing lot graphs, but also for accurately estimating WIP tracking report information based on a statistical model. A statistical model analysis module 801 is used in the WIP tracking system 100 to refine the process flows 803, 805. As described above, the process flows are used to initialize durations and quantities for each process node in the graph-based model. These durations are used to estimate times—e.g., expected time remaining until WIP transitions to the next vendor. In order to provide more reliable WIP tracking, data pertinent to each vendor's process, each customer product and other relevant variables are collected and used to refine the expected duration and yield of each step. Thus, when a lot graph is initialized or revised, the completion times and yields are based on refined estimates. Statistical analysis can also lead to statistical qualification of the advanced notices (e.g., we have 80% confidence that 2000 units will be shipped to you in 3 days). These all will lead to higher vendor confidence in the advanced notices. The updated estimates may also be used to refine the estimated durations and conversion factors contained in already existing lot graphs 1-*n*.

Figure 9:
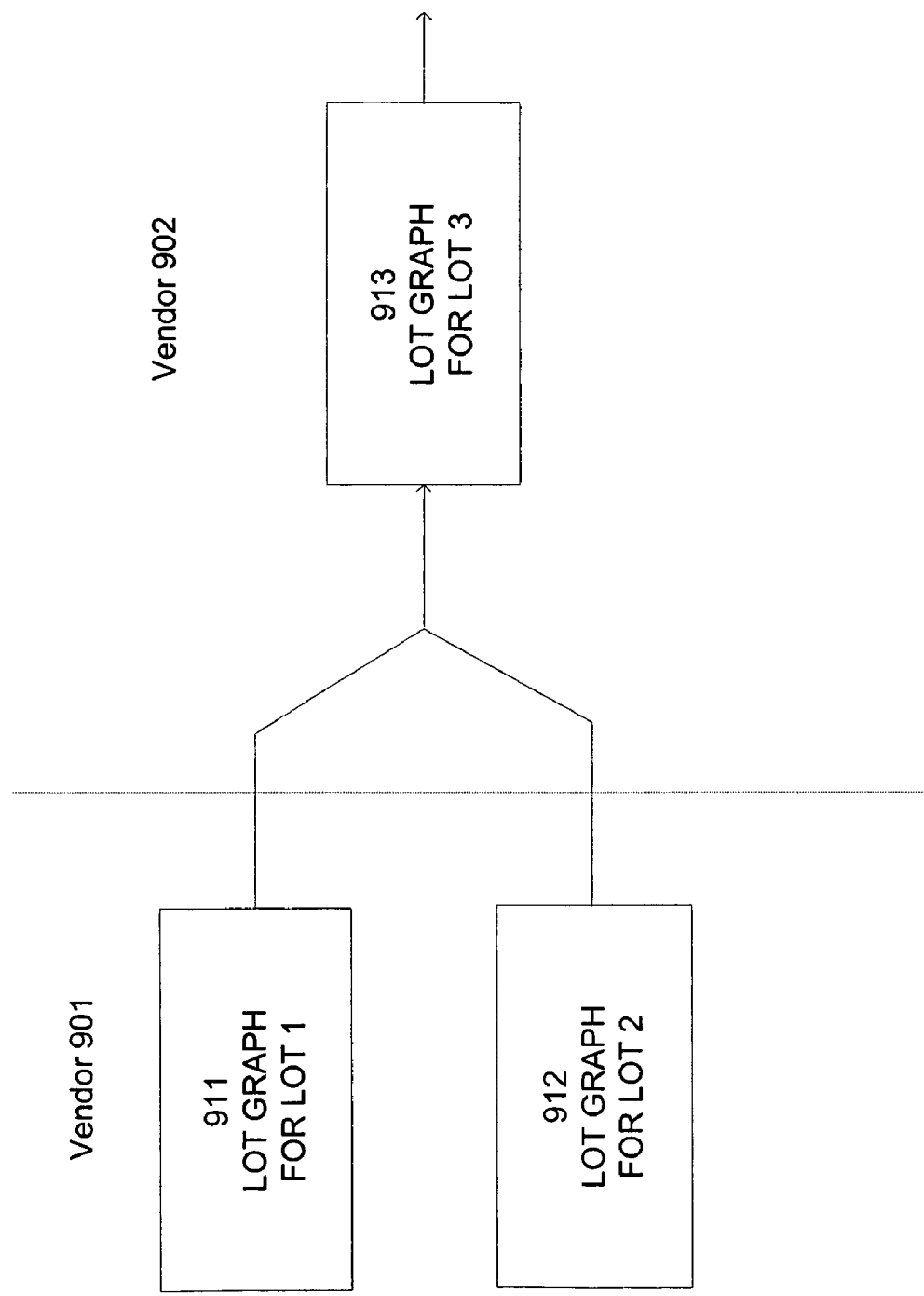
FIG. 9 illustrates a lot join process using a graph-based WIP tracking system.

FIG. 9 shows a Lot Join process in a graph-based data model of the supply chain. Assume that Lot 1 and Lot 2 are two lots which are being processed by supply chain vendor 901. Both of the lots will be sent to another supply chain vendor 902 but merged into a single lot—Lot 3. Under the graph-based model, lot graph 911 and 912 exist for Lots 1 and 2. A new lot graph 913 is created to correspond to the merged lot, Lot 3. The Lot Join is effected using pointers. Each lot graph has a pointer indicating the next lot graph. The pointers for lot graphs 911 and 912 each point to lot graph 913.

Figure 10:
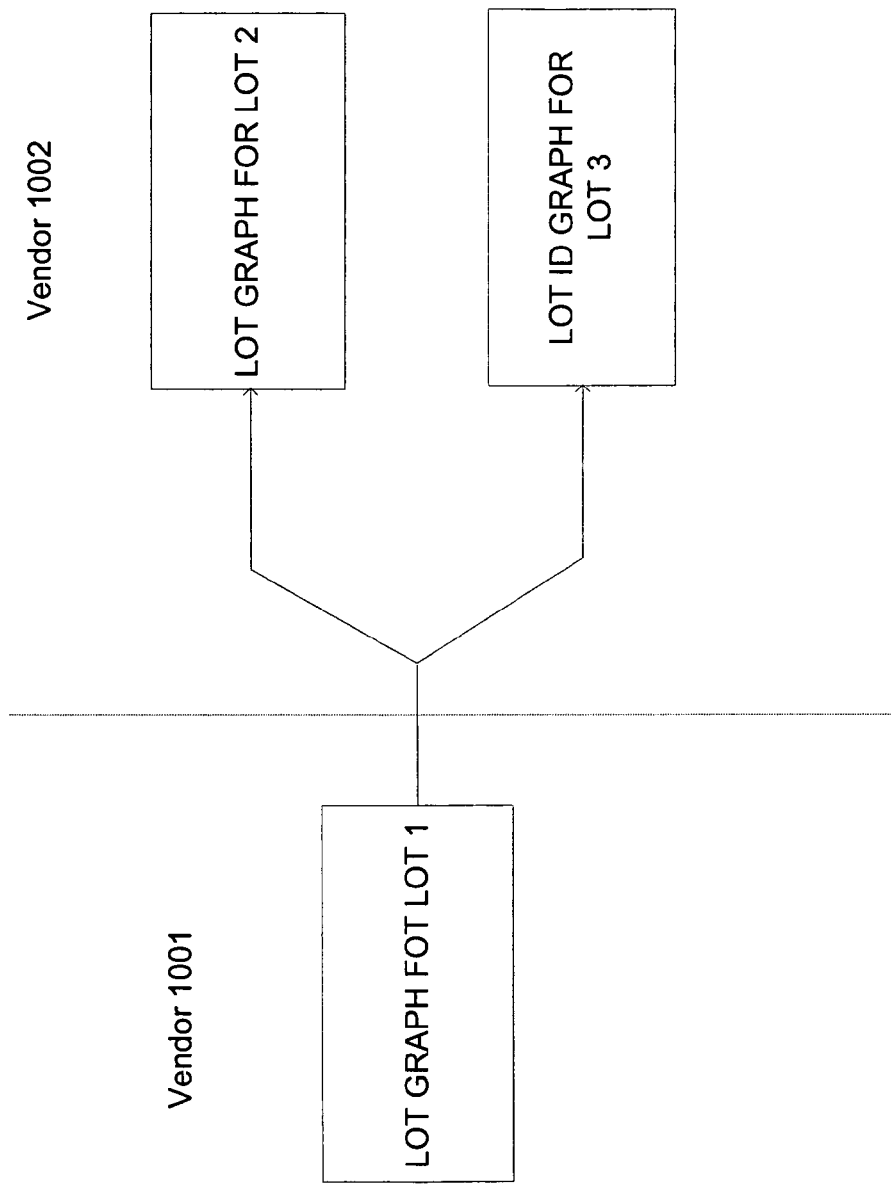
FIG. 10 illustrates a lot split process using a graph-based WIP tracking system.

FIG. 10 shows a Lot Split process in a graph based data model of the supply chain. In this case Lot 1 at vendor 1001 is split into two lots: Lots 2 and 3 at vendor 1002 (or at two different vendors). The Lot Split is effected by having lot graph 1011 for Lot 1 point to both lot graphs 1012 and 1013 (for Lots 2 and 3).

Upon reading this disclosure, those of skill in the art will appreciate additional alternative methods and designs for providing WIP tracking reports and advance notices to coordinate semiconductor supply chain vendors in accordance with the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method of the present invention disclosed herein without departing from the spirit and scope of the invention as defined in the appended claims. Accordingly, the disclosure of the present invention is intended to be illustrative, but not limiting, of the scope of the invention, which is set forth in the following claims.

What is claimed is:

1. A computer-implemented method for generating a work-in-progress (WIP) tracking report for the manufacture of a semiconductor part ordered for a customer, the WIP tracking report reflecting a progress of WIP for the semiconductor part through a semiconductor supply chain of vendors, the method comprising the steps of:
    receiving via a communications network one or more raw WIP updates from one or more vendors in the semiconductor supply chain;
    updating a database representation of the semiconductor supply chain to reflect the received raw WIP updates;
    generating by computer a WIP tracking report from the database representation of the semiconductor supply chain, wherein the WIP tracking report shows at least one measure in expected good ones of the semiconductor part ordered for the customer; and
    making the WIP tracking report available to the customer.

2. The computer-implemented method of claim 1 wherein the WIP tracking report shows a volume of WIP at different stages of the semiconductor supply chain, and the volume of WIP at one or more of the stages is measured in expected good parts.

3. The computer-implemented method of claim 2 wherein:
    the raw WIP updates received from the vendors show a volume of WIP at different steps within a vendor's process;
    the different steps within the vendor's process are mapped to stages for the WIP tracking report; and
    the volume of WIP at different steps within the vendor's process are converted to volume of WIP at different stages in the WIP tracking report.

4. The computer-implemented method of claim 3 wherein a volume of WIP at one or more stages in the WIP tracking report reflect a volume of WIP aggregated over multiple vendors.

5. The computer-implemented method of claim 1 wherein the WIP tracking report shows a volume of expected good parts to be delivered to the customer on certain delivery dates.

6. The computer-implemented method of claim 5 wherein the WIP tracking report shows, for the delivery dates, a volume of requested good parts, a volume of committed good parts and a volume of shipped/projected good parts, where volumes are measured in expected good parts.

7. The computer-implemented method of claim 5 wherein the volume of expected good parts to be delivered to the customer on the certain delivery dates is estimated based on statistical modeling of the semiconductor supply chain.

8. The computer-implemented method of claim 1 wherein the WIP tracking report shows a status of one or more orders of the semiconductor part and volumes are measured in expected good parts.

9. The computer-implemented method of claim 8 wherein the orders include possible statuses of backlogged, WIP and shipped.

10. The computer-implemented method of claim 1 further comprising:
    generating by computer a chart of delivery performance for at least one vendor, wherein the chart is generated from the database representation of the semiconductor supply chain.

11. The computer-implemented method of claim 1 wherein the WIP tracking report is pre-defined and not defined by the customer.

12. The computer-implemented method of claim 1 further comprising:
    generating by computer an internal WIP tracking report from the database representation of the semiconductor supply chain, for a fabless semiconductor provider's internal use.

13. The computer-implemented method of claim 12 wherein volumes reported in the internal WIP tracking report can be different than volumes reported in the WIP tracking report made available to the customer.

14. The computer-implemented method of claim 12 wherein the WIP tracking report made available to the customer reduces bad news compared to the internal WIP tracking report.

15. The computer-implemented method of claim 1 wherein the WIP tracking report is made available to the customer by a secure access method.

16. The computer-implemented method of claim 1 wherein the WIP tracking report is made available to the customer by at least one of Internet access, email delivery, and facsimile.

17. The computer-implemented method of claim 1 wherein a WIP volume is converted to expected good parts based on statistical modeling of the semiconductor supply chain.

18. The computer-implemented method of claim 1 wherein the step of updating a database representation of the semiconductor supply chain comprises:
    consistency checking the received raw WIP updates; and
    updating the database representation of the semiconductor supply chain according to received raw WIP updates that have passed the consistency check.

19. The computer-implemented method of claim 18 wherein the step of updating a database representation of the semiconductor supply chain further comprises:

upon detection of inconsistency in a received raw WIP update, notifying the vendor of the inconsistency.

20. The computer-implemented method of claim 1 further comprising the step of:
 detecting significant deviation between scheduled delivery of the semiconductor parts and estimated delivery of the semiconductor parts according to the WIP tracking report.

21. The computer-implemented method of claim 20 further comprising the step of:
 notifying at least one of a customer, a fabless semiconductor provider and a vendor of the detected deviation.

22. The computer-implemented method of claim 1 wherein at least one volume of WIP in the WIP tracking report is measured in expected good parts.

23. A work-in-progress (WIP) reporting system for generating a WIP tracking report for the manufacture of a semiconductor part ordered for a customer, the WIP tracking report reflecting a progress of WIP for the semiconductor part through a semiconductor supply chain of vendors, the WIP reporting system comprising:
 a WIP database containing a database representation of the semiconductor supply chain;
 a revision engine coupled to the WIP database for updating the database representation of the semiconductor supply chain to reflect raw WIP updates received from one or more vendors via a communications network; and
 a presentation engine coupled to the WIP database for generating and making available to the customer the WIP tracking report, wherein the WIP tracking report shows at least one measure in expected good ones of the semiconductor part ordered for the customer.

24. The WIP reporting system of claim 23 wherein the WIP tracking report shows a volume of WIP at different stages of the semiconductor supply chain, and the volume of WIP at one or more of the stages is measured in expected good parts.

25. The WIP reporting system of claim 24 wherein:
 the raw WIP updates received from the vendors show a volume of WIP at different steps within a vendor's process;
 the different steps within the vendor's process are mapped to stages for the WIP tracking report; and
 the volume of WIP at different steps within the vendor's process are converted to volume of WIP at different stages in the WIP tracking report.

26. The WIP reporting system of claim 25 wherein a volume of WIP at one or more stages in the WIP tracking report reflect a volume of WIP aggregated over multiple vendors.

27. The WIP reporting system of claim 23 wherein the WIP tracking report shows a volume of expected good parts to be delivered on certain delivery dates.

28. The WIP reporting system of claim 27 wherein the WIP tracking report shows, for the delivery dates, a volume of requested good parts, a volume of committed good parts and a volume of shipped/projected good parts, where volumes are measured in expected good parts.

29. The WIP reporting system of claim 27 wherein the volume of expected good parts to be delivered on the certain delivery dates is estimated based on statistical modeling of the semiconductor supply chain.

30. The WIP reporting system of claim 23 wherein the WIP tracking report shows a status of one or more orders of the semiconductor part and volumes are measured in expected good parts.

31. The WIP reporting system of claim 30 wherein the orders include possible statuses of backlogged, WIP and shipped.

32. The WIP reporting system of claim 23 wherein the presentation engine is further for generating a chart of delivery performance for at least one vendor, wherein the chart is generated from the database representation of the semiconductor supply chain.

33. The WIP reporting system of claim 23 wherein the WIP tracking report is pre-defined.

34. The WIP reporting system of claim 23 wherein the presentation engine comprises:
 a customer presentation engine for generating an external WIP tracking report from the database representation of the semiconductor supply chain, for use by a customer; and
 an internal presentation engine for generating an internal WIP tracking report from the database representation of the semiconductor supply chain, for internal use by a fabless semiconductor provider.

35. The WIP reporting system of claim 34 wherein volumes reported in the internal WIP tracking report can be different than volumes reported in the external WIP tracking report.

36. The WIP reporting system of claim 34 wherein the external WIP tracking report reduces bad news compared to the internal WIP tracking report.

37. The WIP reporting system of claim 23 further comprising:
 a customer interface for making the WIP tracking report available to the customer by a secure access method.

38. The WIP reporting system of claim 23 further comprising:
 a customer interface for making the WIP tracking report available to the customer by at least one of Internet access, email delivery, and facsimile.

39. The WIP reporting system of claim 23 wherein a WIP volume is converted to expected good parts based on statistical modeling of the semiconductor supply chain.

40. The WIP reporting system of claim 23 further comprising:
 a WIP consistency checking module coupled to the WIP database for consistency checking the received raw WIP updates, wherein the revision engine updates the database representation of the semiconductor supply chain according to received raw WIP updates that have passed the consistency check.

41. The WIP reporting system of claim 40 wherein, upon detection of inconsistency in a received raw WIP update, the vendor is notified of the inconsistency.

42. The WIP reporting system of claim 23 further comprising:
 an alerts engine coupled to the WIP database for detecting significant deviation between scheduled delivery of the semiconductor parts and estimated delivery of the semiconductor parts according to the WIP tracking report.

43. The WIP reporting system of claim 42 wherein the alerts engine is further for notifying at least one of a customer, a fabless semiconductor provider and a vendor of the detected deviation.

44. The WIP reporting system of claim 23 wherein at least one volume of WIP in the WIP tracking report is measured in expected good parts.

45. A computer readable medium containing software for generating a work-in-progress (WIP) tracking report for the manufacture of a semiconductor part ordered for a customer, the WIP tracking report reflecting a progress of WIP for the semiconductor part through a semiconductor supply chain of vendors, the software for causing a compute facility to execute the steps of:
- receiving via a communications network one or more raw WIP updates from one or more vendors in the semiconductor supply chain;
- updating a database representation of the semiconductor supply chain to reflect the received raw WIP updates;
- generating a WIP tracking report from the database representation of the semiconductor supply chain, wherein the WIP tracking report shows at least one measure in expected good ones of the semiconductor part ordered for the customer; and
- making the WIP tracking report available to the customer.

46. The computer readable medium of claim 45 wherein the WIP tracking report shows a volume of WIP at different stages of the semiconductor supply chain, and the volume of WIP at one or more of the stages is measured in expected good parts.

47. The computer readable medium of claim 46 wherein:
- the raw WIP updates received from the vendors show a volume of WIP at different steps within a vendor's process;
- the different steps within the vendor's process are mapped to stages for the WIP tracking report; and
- the volume of WIP at different steps within the vendor's process are converted to volume of WIP at different stages in the WIP tracking report.

48. The computer readable medium of claim 47 wherein a volume of WIP at one or more stages in the WIP tracking report reflect a volume of WIP aggregated over multiple vendors.

49. The computer readable medium of claim 45 wherein the WIP tracking report shows a volume of expected good parts to be delivered to the customer on certain delivery dates.

50. The computer readable medium of claim 49 wherein the WIP tracking report shows, for the delivery dates, a volume of requested good parts, a volume of committed good parts and a volume of shipped/projected good parts, where volumes are measured in expected good parts.

51. The computer readable medium of claim 49 wherein the volume of expected good parts to be delivered to the customer on the certain delivery dates is estimated based on statistical modeling of the semiconductor supply chain.

52. The computer readable medium of claim 45 wherein the WIP tracking report shows a status of one or more orders of the semiconductor part and volumes are measured in expected good parts.

53. The computer readable medium of claim 52 wherein the orders include possible statuses of backlogged, WIP and shipped.

54. The computer readable medium of claim 45 wherein the software further causes the compute facility to execute the step of:
- generating a chart of delivery performance for at least one vendor, wherein the chart is generated from the database representation of the semiconductor supply chain.

55. The computer readable medium of claim 45 wherein the WIP tracking report is pre-defined.

56. The computer readable medium of claim 45 wherein the software further causes the compute facility to execute the step of:
- generating by computer an internal WIP tracking report from the database representation of the semiconductor supply chain, for a fabless semiconductor provider's internal use.

57. The computer readable medium of claim 56 wherein volumes reported in the internal WIP tracking report can be different than volumes reported in the WIP tracking report made available to the customer.

58. The computer readable medium of claim 56 wherein the WIP tracking report made available to the customer reduces bad news compared to the internal WIP tracking report.

59. The computer readable medium of claim 45 wherein the WIP tracking report is made available to the customer by a secure access method.

60. The computer readable medium of claim 45 wherein the WIP tracking report is made available to the customer by at least one of Internet access, email delivery, and facsimile.

61. The computer readable medium of claim 45 wherein a WIP volume is converted to expected good parts based on statistical modeling of the semiconductor supply chain.

62. The computer readable medium of claim 45 wherein the step of updating a database representation of the semiconductor supply chain comprises:
- consistency checking the received raw WIP updates; and
- updating the database representation of the semiconductor supply chain according to received raw WIP updates that have passed the consistency check.

63. The computer readable medium of claim 62 wherein the step of updating a database representation of the semiconductor supply chain further comprises:
- upon detection of inconsistency in a received raw WIP update, notifying the vendor of the inconsistency.

64. The computer readable medium of claim 45 wherein the software further causes the compute facility to execute the step of:
- detecting significant deviation between scheduled delivery of the semiconductor parts and estimated delivery of the semiconductor parts according to the WIP tracking report.

65. The computer readable medium of claim 64 wherein the software further causes the compute facility to execute the step of:
- notifying at least one of a customer, a fabless semiconductor provider and a vendor of the detected deviation.

66. The computer readable medium of claim 45 wherein at least one volume of WIP in the WIP tracking report is measured in expected good parts.

67. A work-in-progress (WIP) reporting system for generating a WIP tracking report for the manufacture of a semiconductor part ordered for a customer, the WIP tracking report reflecting a progress of WIP for the semiconductor part through a semiconductor supply chain of vendors, the WIP reporting system comprising:
- means for receiving via a communications network one or more raw WIP updates from one or more vendors in the semiconductor supply chain;
- means for updating a database representation of the semiconductor supply chain to reflect the received raw WIP updates;
- means for generating by computer a WIP tracking report from the database representation of the semiconductor supply chain, wherein the WIP tracking report shows at least one measure in expected good ones of the semiconductor part ordered for the customer; and
- means for making the WIP tracking report available to the customer.

* * * * *